United States Patent
Iwabuchi et al.

(10) Patent No.: US 7,293,732 B2
(45) Date of Patent: Nov. 13, 2007

(54) SPINNING REEL

(75) Inventors: Masakazu Iwabuchi, Tondabayashi (JP); Ken'ichi Sugawara, Sakai (JP); Takeshi Ikuta, Sakai (JP); Hirokazu Hiraoka, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/392,638

(22) Filed: Mar. 30, 2006

(65) Prior Publication Data

US 2006/0186242 A1 Aug. 24, 2006

Related U.S. Application Data

(62) Division of application No. 10/901,117, filed on Jul. 29, 2004, now Pat. No. 7,070,138.

(30) Foreign Application Priority Data

Aug. 20, 2003 (JP) .............................. 2003-296346
Dec. 10, 2003 (JP) .............................. 2003-411638

(51) Int. Cl.
*A01K 89/01* (2006.01)
(52) U.S. Cl. ........................ 242/310; 242/311; 242/316
(58) Field of Classification Search ................ 242/310, 242/311, 316
See application file for complete search history.

(56) References Cited

U.S. PATENT DOCUMENTS

| 6,880,776 B2 | 4/2005 | Kitajima |
| 7,051,967 B2 * | 5/2006 | Kitajima ...................... 242/316 |
| 2003/0066920 A1 | 4/2003 | Kitajima |
| 2003/0136867 A1 | 7/2003 | Kitajima |
| 2003/0146324 A1 | 8/2003 | Yeh |
| 2003/0146325 A1 | 8/2003 | Kitajima |
| 2004/0021023 A1 | 2/2004 | Kitajima |
| 2004/0200917 A1 | 10/2004 | Nishikawa |

FOREIGN PATENT DOCUMENTS

| JP | 5-39268 U | 5/1993 |
| JP | 11-137133 A | 5/1999 |
| JP | 2001-136874 A | 5/2001 |
| JP | 2003-274816 A | 9/2003 |

* cited by examiner

*Primary Examiner*—Evan Langdon
(74) *Attorney, Agent, or Firm*—Global IP Counselors, LLP

(57) ABSTRACT

A spinning reel includes a reel unit mounted to a fishing rod, and a rotor rotatably mounted to the reel unit on a front side, and guard members. The guard members include plate-shaped embedded portions and protruding portions. The embedded portion of one guard member is embedded in the reel unit from the rod attachment leg to the rear end portion and the lower and portion. The embedded portions of other guard members are embedded in the rotor on an outer portion of a cylindrical portion, and on an outer portion of a second rotor arm. The protruding portions protrude from the outer surface of the reel unit or the rotor. The guard members can come into contact with the ground when the spinning reel is placed thereon, such that scratching on the reel unit or the rotor can be prevented.

19 Claims, 24 Drawing Sheets

SPINNING REEL

This is a divisional application of application Ser. No. 10/901,117, filed Jul. 29, 2004, now U.S. Pat. No. 7,070,138 which claims right of foreign priority to Japanese Patent Application No. 2003-296346, filed Aug. 20, 2003, and Japanese Patent Application No. 2003-411638, filed Dec. 10, 2003. Certified copies of priority documents have been filed in application Ser. No. 10/901,117.

BACKGROUND OF THE INVENTION

1. Field of the Invention

The present invention generally relates to spinning reels. More specifically, the present invention relates to spinning reels that attach to a fishing rod and enable fishing line to be reeled out and retrieved.

2. Background Information

Spinning reels generally have a reel unit that is mounted to a fishing rod, a rotor rotatably mounted to the reel unit that guides fishing line, and a spool onto which fishing line that has been guided by the rotor is wound. The reel unit is usually formed from a single synthetic resin or metal, and includes a reel body and a T-shaped rod attachment leg which extends diagonally upward from the reel body, and is integral therewith. The rotor includes a cylindrical portion, rotor arms, and a bail arm rotatably mounted to the reel unit. The rotor arms are connected to a rear side outer peripheral portion of the cylindrical portion. Further, the rotor arms oppose each other on both sides of the cylindrical portion. The bail arm is pivotably mounted to fore-ends of the rotor arms. Further, the bail arm guides the fishing line to the spool.

With this type of spinning reel, mounting a planer-shaped cover member over the entire surface from a rear end portion to a lower end portion of the reel unit, or over the entire outer peripheral portion of the rotor arm in order to prevent the reel unit from being scratched is known, as shown in Japanese Unexamined Utility Model Application H5-39268. Such a cover can protect the rear end portion and the lower end portion of the reel unit, and the outer peripheral portion of the rotor arm, which can come into contact with the ground when the spinning reel is placed thereon.

However, with this type of spinning reel with the cover member mounted thereto, since the cover member covers a wide area such as the entire reel unit or rotor, the cover member itself may be scratched due to contact with the ground when the spinning reel is placed on the ground. This scratching leads to a less attractive appearance.

To address this issue, fixing a cushioning member made of an elastic substance to a location which can come into contact with the ground when the spinning reel is placed on the ground is known, as shown in Japanese Unexamined Patent Application 2001-136874. The cushioning member is made of an elastic synthetic resin material, and is a rod shaped member mounted to a groove portion formed on a curved portion of the reel unit or rotor. In this case, a portion of the rotor, which easily comes in contact with the ground in a conventional manner, does not directly touch the ground. Thus, the rotor is hardly scratched even when the spinning reel is placed on the ground.

With the above conventional spinning reel having a cushion member, the cushion member made of an elastic synthetic resin material is mounted to the reel unit or the rotor. However, spinning reels normally used outdoors often come into contact with hard places such as rocks when the spinning reels are placed on the ground. Thus, the cushion member deteriorates and sometimes peels away from the reel unit or the rotor due to the resulting contact friction. If the cushion member peels away from the reel unit or the rotor, the reel unit or the rotor directly comes in contact with the ground. Thus, the reel unit or the rotor may be scratched.

In view of the above, it will be apparent to those skilled in the art from this disclosure that there exists a need for an improved spinning reel. This invention addresses this need in the art as well as other needs, which will become apparent to those skilled in the art from this disclosure.

SUMMARY OF THE INVENTION

It is an object of the present invention to provide a spinning reel, in which scratching of a reel unit or a rotor is prevented.

A spinning reel according to a first aspect of the present invention is mounted to a fishing rod and capable of paying out fishing line. The spinning reel includes a reel unit, a spool, a rotor, and a guard member. The reel unit is adapted to be mounted on the fishing rod. The spool is movably mounted to the reel unit to move back and forth relative to said reel unit, and has an outer peripheral portion on which the fishing line is wound and unwound. The rotor is rotatably mounted to the reel unit, and is adapted to wind the fishing line onto the spool. The guard member includes a plate-shaped embedded portion embedded in at least one of the reel unit and the rotor, and a protruding portion that protrudes from an outer peripheral surface of at least the one of the reel unit and the rotor. The protruding portion is formed so as to be connected with the embedded portion.

This spinning reel has the guard member that includes the plate-shaped embedded portion embedded in at least one of the reel unit and the rotor, and the protruding portion that protrudes from the outer surface of the reel unit or the rotor and is connectedly formed with the embedded portion. In this case, since the protruding portion protrudes from the outer surface of the reel unit and rotor, a surface of the reel unit or rotor, which easily comes in contact with the ground in a conventional reel, does not directly touch the ground. Thus, scratching on the reel unit or the rotor is prevented even when the spinning reel is placed on the ground.

In addition, since the plate-shaped embedded portion is embedded in the reel unit or the rotor, the peeling of the guard member from the reel unit or the rotor is also prevented. Thus, this structure can prevent the reel unit or the rotor from being scratched. Furthermore, since the embedded portion is formed in a plate shape, it is possible to improve attachment accuracy relative to the reel unit or the rotor. Accordingly, the posture of the embedded portion can be easily adjusted relative to the reel unit or the rotor.

A spinning reel in accordance with a second aspect of the present invention is the spinning reel according to the first aspect, wherein the reel unit further includes a reel body in which various mechanisms are mounted therein, and a generally T-shaped rod attachment leg which extends diagonally upward from the reel body and is integral therewith. The guard member is embedded in at least one of a rear end portion of the reel unit, a lower end portion of the reel unit, and a rear end portion of the rod attachment leg. In this case, the guard member is, for example, mounted from the rear end portion to the lower end portion of the reel unit. Thus, scratching of the reel unit is prevented when the spinning reel is placed on the ground. Additionally, if a cover member is further mounted to the rear end portion of the reel unit and the rear end portion of the rod attachment leg, the guard member is embedded in the rear end portion of the cover member, such that the reel unit is further prevent from being scratched.

A spinning reel in accordance with a third aspect of the present invention, is the spinning reel according to the first or second aspects, wherein the reel unit further includes a body member in which the various mechanisms are mounted therein, and a lid member fastened to the body member with a screw. A groove portion is formed in at least one of the body member and the lid member. The guard member is embedded in the groove portion formed in the body member or the lid member. In this case, if the guard member is mounted to the groove portion of the body member for example, even when the lid member is detached from the body member, the guard member is still mounted. Thus, respective members are not prone to come apart.

A spinning reel in accordance with to a fourth aspect of the present invention is the spinning reel according to the first or second aspects, wherein the guard member is embedded in a groove portion formed in a joint portion between the body member and the lid member. In this case, the groove portion can be easily formed. Additionally, where a screw member fastening the lid member to the body member is also used to fasten the guard member, it is possible to reduce manufacturing costs.

A spinning reel according to a fifth aspect of the invention, is the spinning reel according to any of the first to fourth aspects of the invention, wherein the rotor further includes a cylindrical portion, rotor arms, and a bail arm. The cylindrical portion is rotatably mounted to the reel unit. The rotor arms are arranged on said cylindrical portion opposite each other and connectedly formed with a rear side outer peripheral surface of said cylindrical portion. The bail arm is pivotably mounted to fore-ends of said rotor arms to guide said fishing line to said spool. The guard member is embedded in at least one of an outer peripheral portion of the cylindrical portion, an outer peripheral portion of the rotor arm, and an outer peripheral portion of the bail arm. In this case, the guard member is mounted over the outer peripheral portion of the rotor, thus, the rotor is hardly scratched when the spinning reel is placed on the ground.

A spinning reel in accordance with a sixth aspect of the present invention is the spinning reel according to the fifth aspect of the invention, wherein at least one of the rotor arms has a hole portion penetrating from an inner periphery to the outer peripheral portion of the rotor arm, and first and second groove portions that are respectively formed in front and rear sides of the hole portion. The guard member is embedded in the first and second groove portions to connect a front end portion to a rear end portion. In this case, the guard member is mounted across the hole portion from at the front to the rear sides of the hole portion. This arrangement can improve the appearance of the design.

A spinning reel in accordance with a seventh aspect of the present invention is the spinning reel according to any of the first to sixth aspects of the invention, wherein the guard member is fastened to at least one of the reel unit and the rotor with a screw. In this case, the guard member can be easily and reliably fastened.

A spinning reel in accordance with an eighth aspect of the present invention is the spinning reel according to any of the first to seventh aspects of the invention, wherein the guard member is made of a hard material such as hard metal or hard synthetic resin. In this case, since the strength of the guard member is maintained at a high level, it is possible to prevent the guard member from being scratched.

A spinning reel in accordance with a ninth aspect of the present invention is the spinning reel according to the eighth aspect of the invention, wherein the guard member is made of a metal member. In this case, the guard member is made of a hard metal such as a stainless steel alloy. Accordingly, the strength of the guard member is maintained at a high level.

A spinning reel in accordance with a tenth aspect of the present invention is the spinning reel according to the eighth aspect of the invention, wherein the guard member is made of a synthetic resin member. In this case, the guard member is made of a hard synthetic resin. Accordingly, the weight of the guard member can be reduced, while the strength of the guard member can be maintained at a high level.

A spinning reel in accordance with an eleventh aspect of the present invention is the spinning reel according to any of the first to tenth aspects of the invention, wherein a part of said protruding portion extends linearly to define a flat surface. In this case, since the protruding portion is partially formed as a flat surface that extends linearly, the strength of the protruding portion can be maintained at a high level. Thus, it is possible to prevent the guard member from being scratched.

A spinning reel in accordance with a twelfth aspect of the present invention is the spinning reel according to any of the first to tenth aspects of the invention, wherein the protruding portion has a greater width than a width of the embedded portion. The protruding portion extends along a contour of the outer surface of the one of the reel unit and the rotor in a direction transverse to a length of the guard member. In this case, since the protruding portion is arranged along the outer surface to extend laterally, the protruding portion of the guard member can cover a wide area of the outer surface of the reel unit or the rotor. Thus, it is possible to prevent reliably the reel unit or the rotor from being scratched.

A spinning reel in accordance with a thirteenth aspect of the present invention is the spinning reel according to the twelfth aspect of the invention, wherein the protruding portion is extends on both sides of the embedded portion along a contour of the outer surface of the one of the reel unit and said rotor. In this case, since the protruding portion is arranged to extend laterally toward both sides of the embedded portion, the protruding portion can be easily fastened to the reel unit or the rotor.

A spinning reel in accordance with a fourteenth aspect of the present invention is the spinning reel according to the twelfth or thirteenth aspect of the invention, wherein the protruding portion is formed unitarily with the embedded portion. In this case, the protruding portion and the embedded portion can be integrally formed as a one-piece unitary member from, for example, a hard material. Thus, it is possible to prevent the guard member from being scratched.

A spinning reel in accordance with a fifteenth aspect of the present invention is the spinning reel according to any of the first through thirteenth aspects of the invention, wherein the protruding portion and the embedded portion are formed of different materials. In this case, for example, the embedded portion can be made of a material with high strength, while the protruding portion can be made of a material that is easy to form or is malleable to extend along the outer surface of the reel unit or the rotor.

A spinning reel in accordance with a sixteenth aspect of the invention is the spinning reel according to the fifteenth aspect of the invention, wherein one of the protruding portion or the embedded portion is made of a synthetic resin, and the other is made of a metal. In this case, the embedded portion can be made of a metal with high strength, while the protruding portion can be made of a synthetic resin that is easy to form or is malleable to extend along the outer surface of the reel unit or the rotor, for example.

A spinning reel in accordance with a seventeenth aspect of the present invention is the spinning reel according to the sixteenth aspect of the invention, wherein the one of the protruding portion and the embedded portion made of a synthetic resin is bonded to a surface of the other one of the protruding portion and the embedded portion made of a metal. In this case, in order to bond the protruding portion and the embedded portion together, the protruding portion made of a synthetic resin can be formed by insert-molding the protruding portion in the embedded portion made of a metal member. Alternatively, the protruding portion made of a synthetic resin can also be bonded to the embedded portion by first forming a diffusion layer by diffusing fine triazine thiol powders with an electrodeposition plating process, and then integrally forming the protruding portion with the diffusion layer. Thus, the protruding portion will be firmly bonded to the embedded portion.

A spinning reel in accordance with an eighteenth aspect of the present invention is the spinning reel according to any of the first to seventeenth aspects of the invention, wherein the embedded portion is embedded in at least one of the reel unit and the rotor such that the protruding portion contacts a ground when the spinning reel is placed on the ground. In this case, the embedded portion is embedded in a portion of the rear end portion and lower end portion of the reel unit or the outer peripheral portion of the rotor that comes into contact with the ground when the spinning reel is placed on the ground. Thus, this can ensure that scratching of the reel unit or the rotor is prevented.

A spinning reel in accordance with an nineteenth aspect of the present invention is the spinning reel according to any of the first to eighteenth aspects of the invention, wherein the guard member has a narrower portion and a wider portion, the wider portion having a width that is wider than a width of said narrower portion.

A spinning reel in accordance with a twentieth aspect of the present invention is the spinning reel according to any of the first to nineteenth aspects of the invention, wherein the guard member has a thicker portion and a thinner portion, the thicker portion having a thickness that is greater than a thickness of the thinner portion.

A spinning reel in accordance with a twenty-first aspect of the present invention is the spinning reel according to any of the first to twentieth aspects of the invention, wherein the guard member is a plate member.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A spinning reel in accordance with the present invention includes a guard member. The guard member has a plate-shaped embedded portion in at least one of the reel unit and the rotor, and a protruding portion protruding from the outer peripheral surface of one of the reel unit and the rotor, and connectedly formed with the embedded portion. Therefore, scratching of the reel unit or the rotor is prevented when the spinning reel is placed on the ground.

Figure 1:
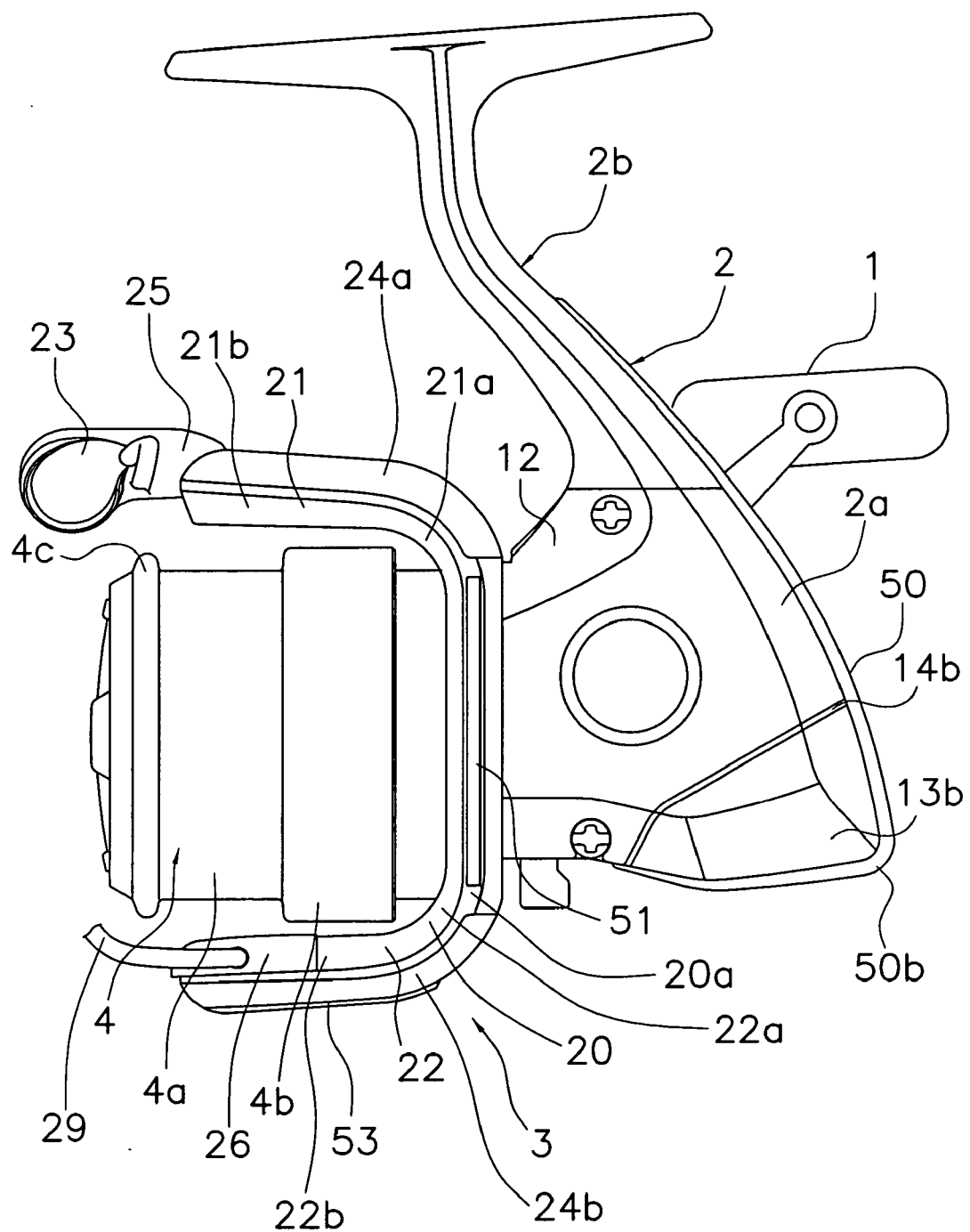
FIG. 1 is a side view of a spinning reel in accordance with a preferred embodiment of the present invention.
Figure 2:
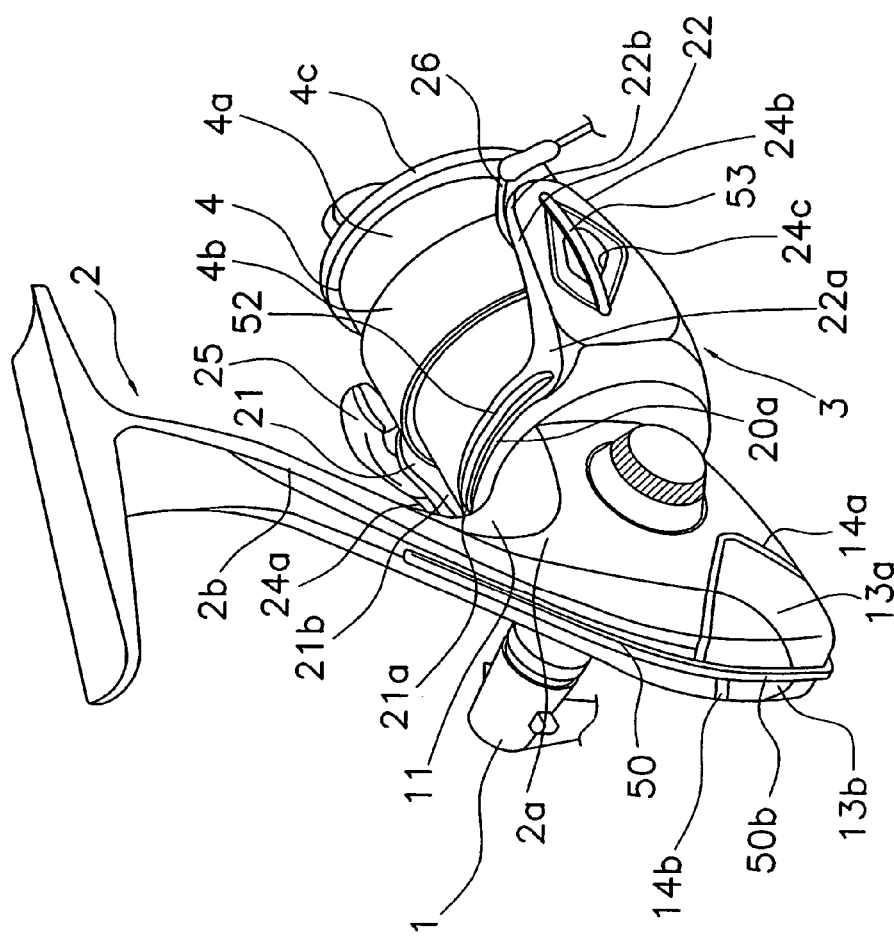
FIG. 2 is a perspective view of the spinning reel as viewed from the rear side thereof.
Figure 3:
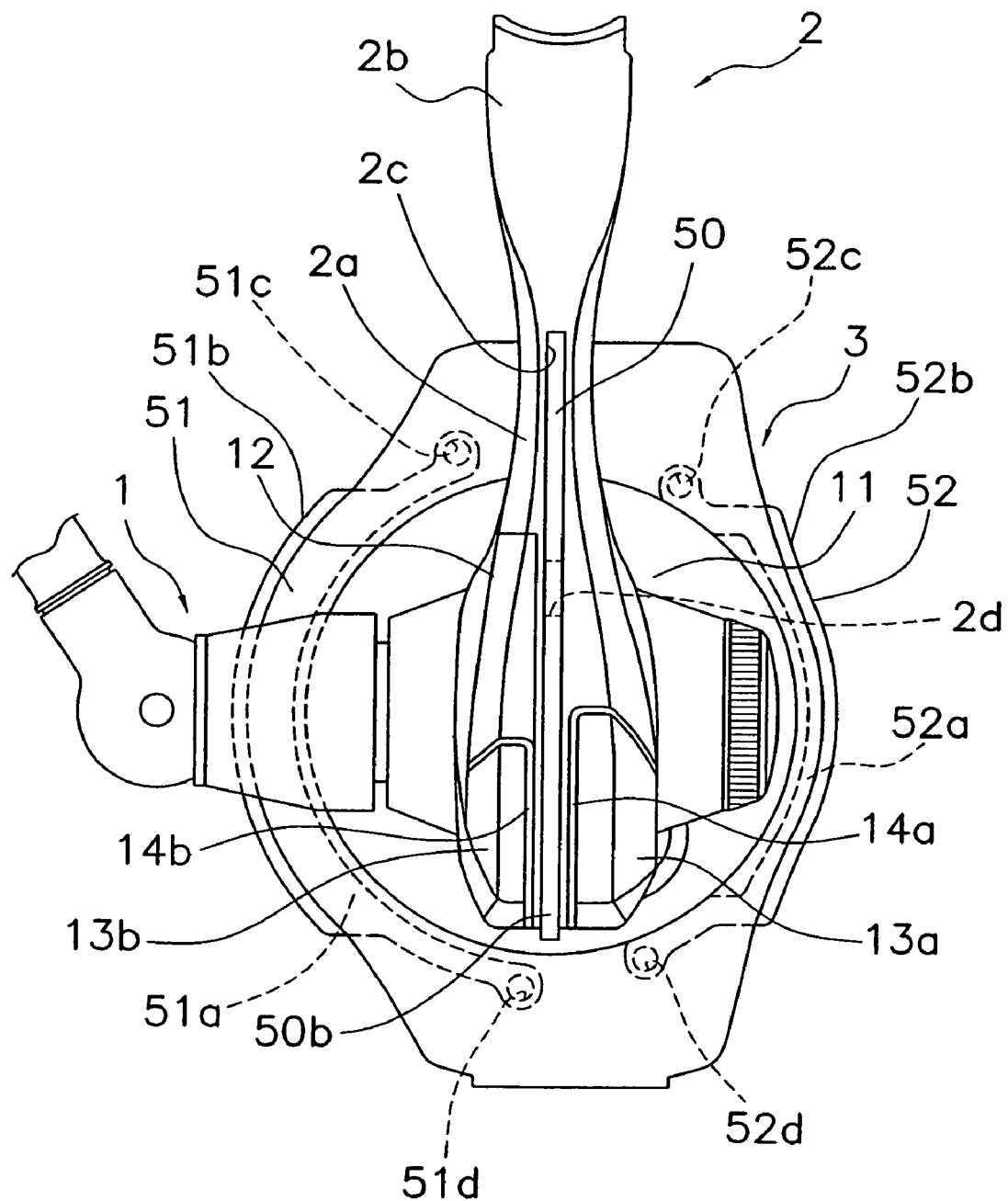
FIG. 3 is a rear view of the spinning reel.

FIGS. 1-3 show a spinning reel in accordance with a preferred embodiment of the present invention. The spinning reel has a reel unit 2 that has a handle 1 and is fitted to a fishing rod, a rotor 3 disposed on a front part of the reel unit 2, and a spool 4 disposed on the front part of the rotor 3. The rotor 3 is rotatively mounted to the reel unit 2 to wind fishing line onto the spool in response to rotation of the handle 1. The spool 4 is mounted to the reel unit 2 to be capable of back-and-forth movement relative thereto.

The reel unit 2 is made of, for example, a magnesium alloy, and includes a reel body 2a and an approximately T-shaped rod attachment portion 2b that extends upward from the reel body 2a shown in FIG. 1. Inside of the reel body 2a, a rotation transmission mechanism and an oscillating mechanism (not shown) for moving the spool 4 back and forth relative to the reel body 2a in synchronization with the rotation of the rotor 3 of the handle 1 are provided.

As seen in FIGS. 1 and 2, the reel body 2a further includes a body member 11 and a lid member 12. An opening is provided on the side of the body member 11. A cranking mechanism and the oscillation mechanism (not shown) are installed inside the body member 11. The lid member 12 is fastened to the body member 11 by at least one screw to cover the opening of the body member 11. The body member 11 is formed unitarily with the rod attachment leg 2b. Inner cover members 14a and 14b preferably made of a synthetic resin are mounted to the body member 11 and the lid member 12, respectively, at a lower rear end portion of the reel body 2a. Outer cover members 13a and 13b are mounted to the inner cover members 14a and 14b. Outer sides of the outer cover members 13a and 13b are plated to give them a metallic appearance. In addition, a first guard member 50 is a plate member embedded in a rear end portion 11a of the body member 11 and the rear end portion 2b1 of the rod attachment leg 2b, such that the guard member 50 can contact the ground when the spinning reel is placed thereon.

Figure 7:
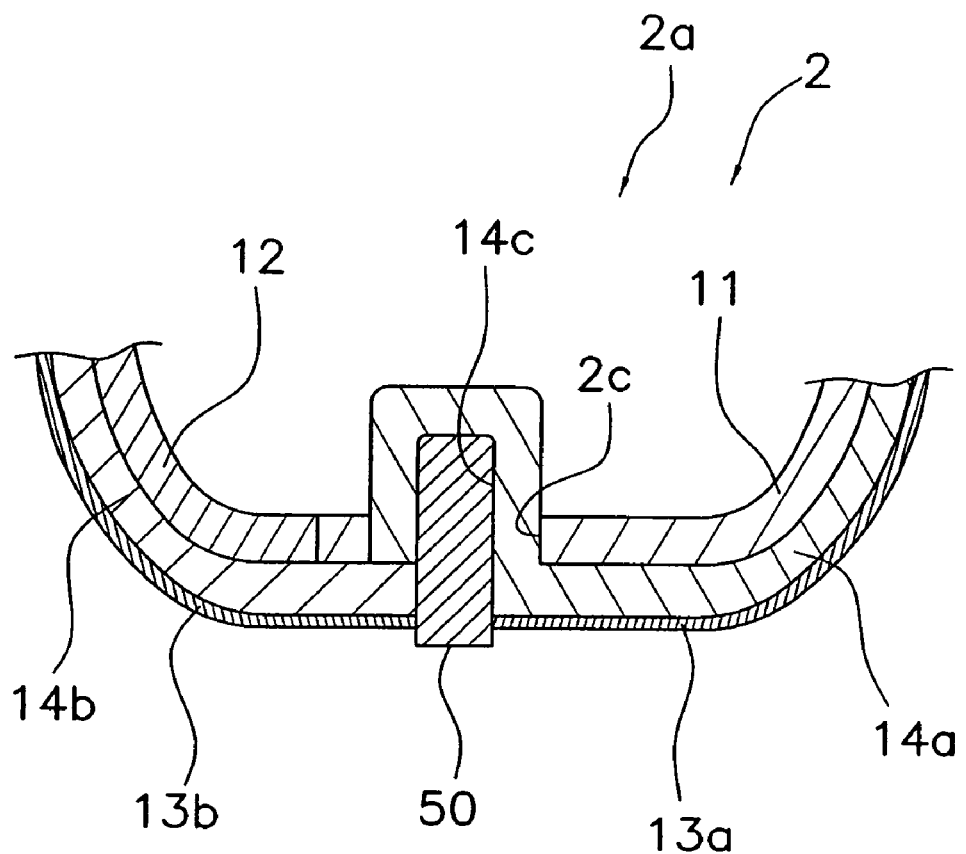
FIG. 7 is a cross-sectional view of a rear portion of the reel unit.

The inner cover members 14a and 14b and the outer cover member 13a and 13b play a role of a cover member, which is mounted to cover the lower rear end portions of the body member 11 and the lid member 12, as shown in FIGS. 1-3. As shown in FIG. 7, on the interior or body member 11 side, the inner cover 14a is mounted to and in a groove portion 2c formed in the body member 11 as described below. A groove portion 14c with a generally U-shaped cross-sectional shape is formed in the inner cover 14a so that the first guard member 50 is embedded therein. The inner cover member 14a is fastened together with the first guard member 50 to the body member 11 by interposing the inner cover 14a between the first guard member 50 and the body member 11 when the first guard member 50 is fastened to the body member 11. Additionally, the outer cover members 13a and 13b are fastened to the inner cover members 14a and 14b from their inner sides with screw members (not shown).

Figure 4:
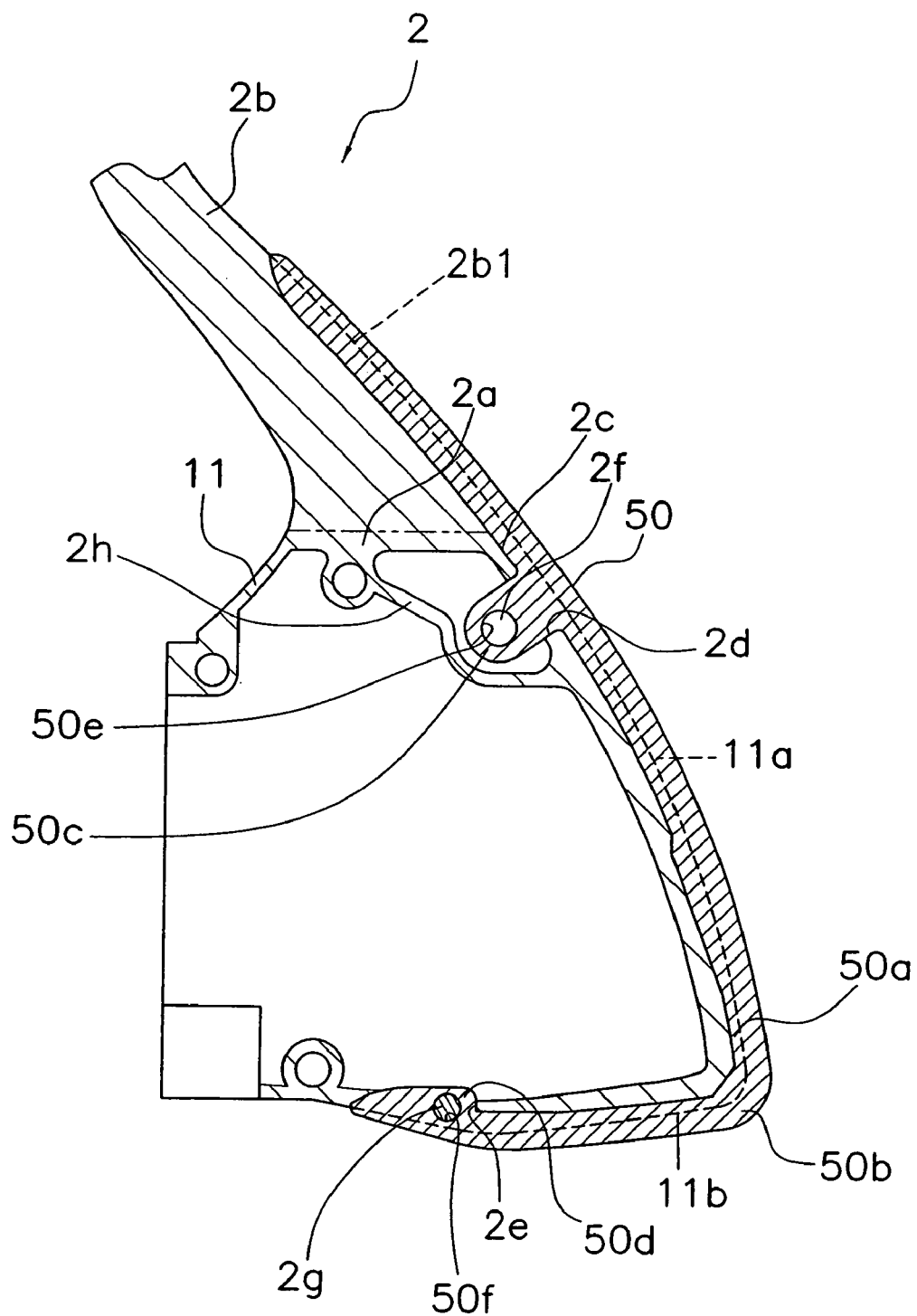
FIG. 4 is a cross-sectional side view of a reel unit of the spinning reel.

As shown in FIGS. 3 and 4, the first guard member 50 is a generally L-shaped member when viewed from the side, and extends from the rod attachment leg 2b to the rear end portion 11a and the lower end portion 11b of the body member 11. Further, the first guard member 50 is formed by T-slot processing. The first guard member 50 includes a plate-shaped embedded portion 50a (see FIG. 4) embedded in the groove portion 2c, and a protruding portion 50b integrally formed with the embedded portion 50a as a one-piece unitary member and protruding from the contour of the rod attachment leg 2b and the rear and lower end portions 11a and 11b of the body member 11. The first guard member 50 is a plate-shaped member with a generally U-shaped cross-sectional shape made of a hard material including a hard metal such as a stainless steel alloy.

As shown in FIG. 4, the body member 11 includes through holes 2d and 2e, a threaded hole 2f, a positioning pin 2g, and a wall portion 2h. The through holes 2d and 2e penetrate at two locations of a rear portion and a lower portion of the body member 11. The threaded hole 2f is formed at an inner periphery side of the through hole 2d. The positioning pin 2g is arranged at an inner periphery side of the through hole 2e and protrudes therefrom. The wall portion 2h is disposed to have a wall shape surrounding the periphery of the threaded hole 2f in the rear portion. The wall portion 2h is disposed to come in contact with a backside surface of the lid member 12 when the lid member 12 is mounted. Thus, it is possible to provide watertight sealing inside. The first guard member 50 further includes an attachment portion 50c protruding toward the inner periphery side in the rear portion. A through hole 50e is formed at the end part of the attachment portion 50c. The attachment portion 50c fastens the first guard member 50 to the body member 11 with a screw member (not shown) that passes through the through hole 2d aligning the through hole 50e with the threaded hole 2f. In addition, the first guard member 50 includes a positioning portion 50d protruding toward the inner periphery side in the lower portion. A through hole 50f is formed at the end part of the positioning portion 50d. The positioning portion 50d is inserted in the through hole 2e to position the first guard member 50 relative to the body member 11 by inserting the positioning pin 2g into the through hole 50f.

The rotor 3 includes, as shown in FIGS. 1, 2, and 3, a cylindrical portion 20 rotatably mounted to a reel unit 2, a first rotor arm 21 and a second rotor arm 22 furnished sideways on the cylindrical portion 20 opposing each other, and a bail arm 23 pivotably attached to the first rotor arm 21 and the second rotor arm 22 for guiding the line.

Figure 5:
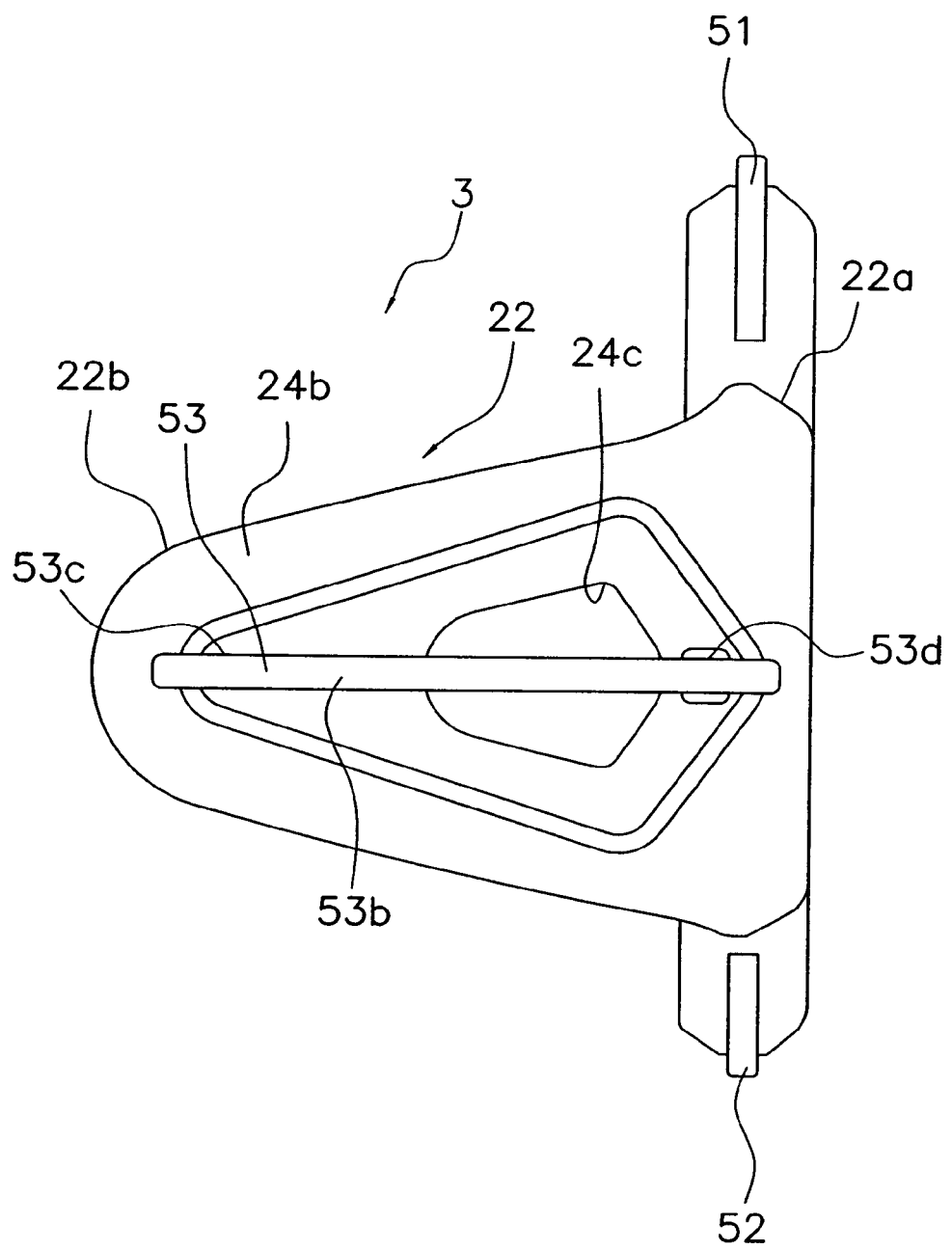
FIG. 5 is a plan view of a rotor arm of the spinning reel.
Figure 6:
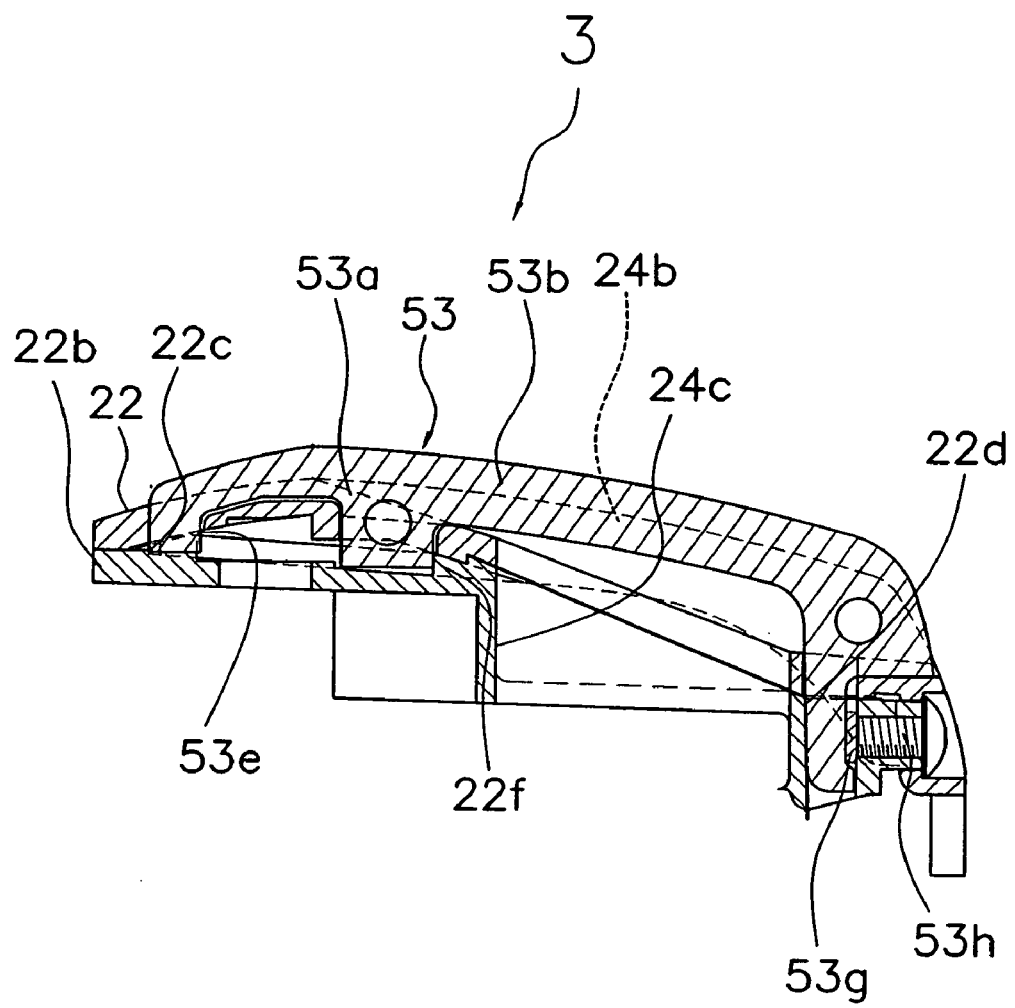
FIG. 6 is a cross-sectional side view of the rotor arm.

The cylindrical portion 20 is preferably made of a magnesium alloy or an aluminum alloy for example, and has a ring-like large-diameter portion 20a that is diametrically larger than the rest of the cylindrical portion 20. The first and the second rotor arms 21 and 22 are unitarily formed as one piece with the cylindrical portion 20 and formed on opposite positions on the outer circumferential surface of the large-diameter portion 20a. The first and second rotor arms 21 and 22 include a pair of first and second connection portions 21a and 22a, a pair of first and second arm portions 21b and 22b, and first and second cover portions 24a and 24b. The pair of the first and second connection portions 21a and 22a extends radially outward from the large-diameter portion 20a at opposite positions on the outer circumferential surface of the large-diameter portion 20a. The pair of the first and second arm portions 21b and 22b extends frontward from the first and second connection portions 21a and 22a, maintaining a certain distance from the cylindrical portion 20. The first and second cover portions 24a and 24b cover outer surfaces of the first and second connection portions 21a and 22a and the first and second arm portions 21b and 22b. The first and the second connection portions 21a and 22a protrude from the outer circumferential surface of the large-diameter portion 20a, and taper off radially. The first and second arm portions 21b and 22b extend forward in a curve protruding from the first and second connection portions 21a and 22a. The first and second cover portions 24a and 24b are made of, for example, a magnesium alloy or an aluminum alloy. The first and second cover portions 24a and 24b are curved convexly outward to cover the outer surfaces of the first and second connection portions 21a and 22a and the first and second arm portions 21b and 22b. Internal spaces are defined by the first and second cover portions 24a and 24b, the first and second connection portions 21a and 22a, and the first and second arm portions 21b and 22b. As shown in FIGS. 2, 5, and 6, the second rotor arm 22 further includes a generally quadrilateral-shaped hole portion 24c penetrating from an inside surface of the second arm portion 22b to an outer surface of the second cover portion 24b. In addition, guard members 51-53 are plate members embedded in two locations on the outer peripheral portion of the cylindrical portion 20 and the outer peripheral portion of the second rotor arm 22, which can come into contact with the ground when the spinning reel is placed thereon. The second and third guard members 51 and 52 are embedded in symmetrical locations along the circumferential direction in the cylindrical portion 20. As shown in FIGS. 1, 2, 5 and 6, the fourth guard member 53 is embedded in the second arm portion 22b and the second cover portion 24b along the longitudinal direction.

As shown in FIGS. 5 and 6, the fourth guard member 53 is embedded in first and second groove portions 22c and 22d formed at the front end and rear end sides of the hole portion 24c respectively. The fourth guard member 53 is mounted from the front end to the rear end of the hole portion 24c to connect the front end portion to the rear end portion of the hole portion 24c. The fourth guard member 53 includes a plate-shaped embedded portion 53a (see FIG. 6) embedded in the first and second groove portions 22c and 22d. The fourth guard member 53 also includes a protruding portion 53b protruding from the outer peripheral surfaces of the first arm portion 21b and the first cover portion 24a so that a part of an end surface of the embedded portion 53a extends in the form of a line-segment along the contact surface. The fourth guard member 53 is a plate-shaped member with a generally U, L. or E shaped cross-sectional shape made of a hard metal such as a stainless steel alloy. A notch portion 53e is formed in the embedded portion 53a embedded in the first groove portion 22c such that a screw attachment portion of a second bail supporting member 26, shown in FIG. 2 and described later, will not be attached to the guard member 53. The embedded portion 53a embedded in the first groove portion 22c is positioned by a protruding portion 22f formed on the second arm portion 22b. The embedded portion 53a is fastened to the second groove portion 22d by pressing the embedded portion 53a with a screw member 53h through a spacer member 53g. The spacer member 53g is made of a synthetic resin, for example. Interposing the spacer member 53g can prevent wobble of the fourth guard member 53.

As shown in FIG. 3, the second and third guard members 51 and 52 include plate-shaped embedded portions 51a and 52a embedded in the groove portions, and protruding portions 51b and 52b protruding from the outer contour of the rotor 3. The second and third guard members 51 and 52 are plate-shaped members with a generally round arcuate cross-sectional shape preferably made of a hard metal such as a stainless steel alloy. The second and third guard members 51 and 52 are respectively fastened to the cylindrical portion 20 by screw members or pin members (not shown) inserted into a pair of attachment portions 51c and 51d, and a pair of attachment portions 52c and 52d, which are arranged at both ends of the respective guard members 51 and 52.

Referring now to FIGS. 1 and 2, the bail arm 23 guides fishing line onto the spool 4. The bail arm 23 has first and second bail support members 25 and 26, a line roller 27, a fixed shaft cover (not shown in Figs.), and a curved bail 29. The first and second bail support members 25 and 26 are pivotally fitted to each of the edges of a pair of rotor arms 21 and 22. The line roller 27 is rotatably fitted to the edge of the first bail support member 25. The fixed shaft cover is oppositely disposed between the first bail support member 25 and the line controller 27. The curved bail 29 is made of a wire rod that links the second bail support member 26 to the fixed shaft cover. The first bail support member 25 is pivotably mounted at the outer side of the first rotor arm 21, while the second bail support member 26 is pivotably mounted on the inner side of the second rotor arm 22.

The spool 4 includes a bobbin trunk 4a, a skirt 4b, and a flange portion 4c. The bobbin trunk 4a is provided to wind around its circumference fishing line guided by the bail arm 23. The skirt 4b, which is arranged on the rear of the bobbin trunk 4a between the first rotor arm 21 and the second rotor arm 22, has a larger diameter than that of the bobbin trunk 4a. The flange portion 4c is arranged on the front of the bobbin trunk 4a. The spool 4 moves backward and forward relative to the reel body 2a in synchronization with rotation of the rotor 3, and uniformly winds fishing line guided by the bail arm 23 onto the circumferential surface of the spool 4.

As seen in FIGS. 1-4 and 6, the guard members 50-53 are mounted to the spinning reel as constituted above and thus, are configured and arranged such that the protruding portions 50b-53b contact a flat ground surface when the spinning reel is placed thereon. The guard members 50-53 include the plate-shaped embedded portions 50a-53a and the protruding portions 50b-53b. The plate-shaped embedded portions 50a-53a are respectively embedded in: from the rod attachment leg 2b to the rear end portion and the lower and portion of the reel unit 2, opposite sides on the outer peripheral portion of the cylindrical portion 30, and the outer peripheral portion of the second rotor arm 22. The aforementioned locations normally contact the ground when the spinning reel is placed thereon. The protruding portions 50b-53b protrude from the outer portion surfaces, so as to contact the ground when the reel is placed thereon. In this case, since the protruding portions 50b-53b protrude from the outer surfaces of the reel unit 2 or the rotor 3, surfaces of the reel unit and the rotor that easily comes into contact with the ground in a conventional structure do not directly touch the ground. Thus, scratching of the reel unit 2 or the rotor 3 is prevented even when the spinning reel is placed on the ground.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 24:
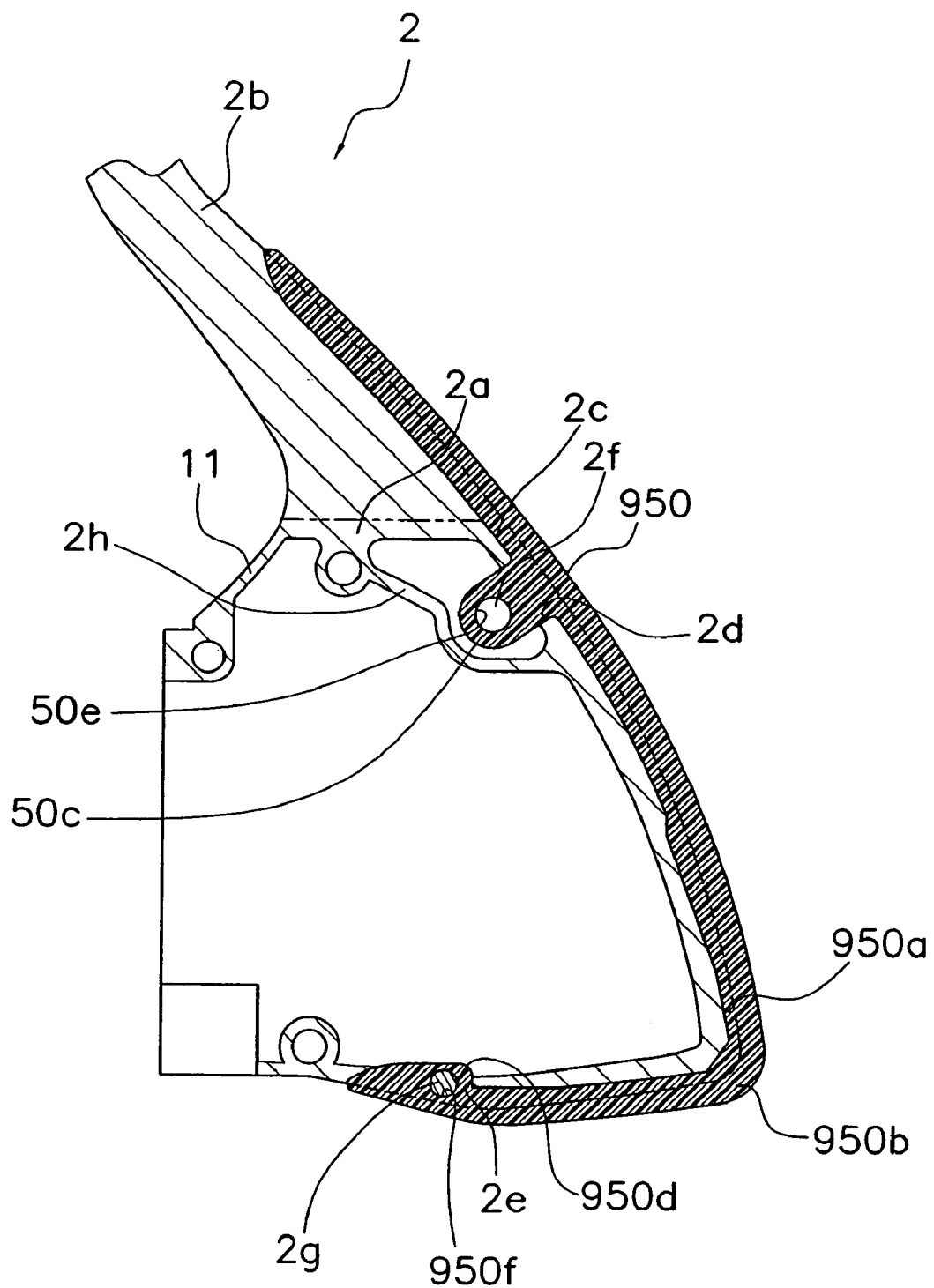
FIG. 24 is a cross-sectional side view of a reel unit of the spinning reel in accordance with another preferred embodiment (a) of the present invention corresponding to FIG. 4.

(a) In the first embodiment, the rotor 3 with the first and second cover portions 24a and 24b is made of an aluminum alloy or magnesium alloy, however, it may be made of a synthetic resin as shown in FIG. 24. In addition, the first and second cover portions 24a and 24b, or the large-diameter portion 20a may be omitted.

Figure 22:
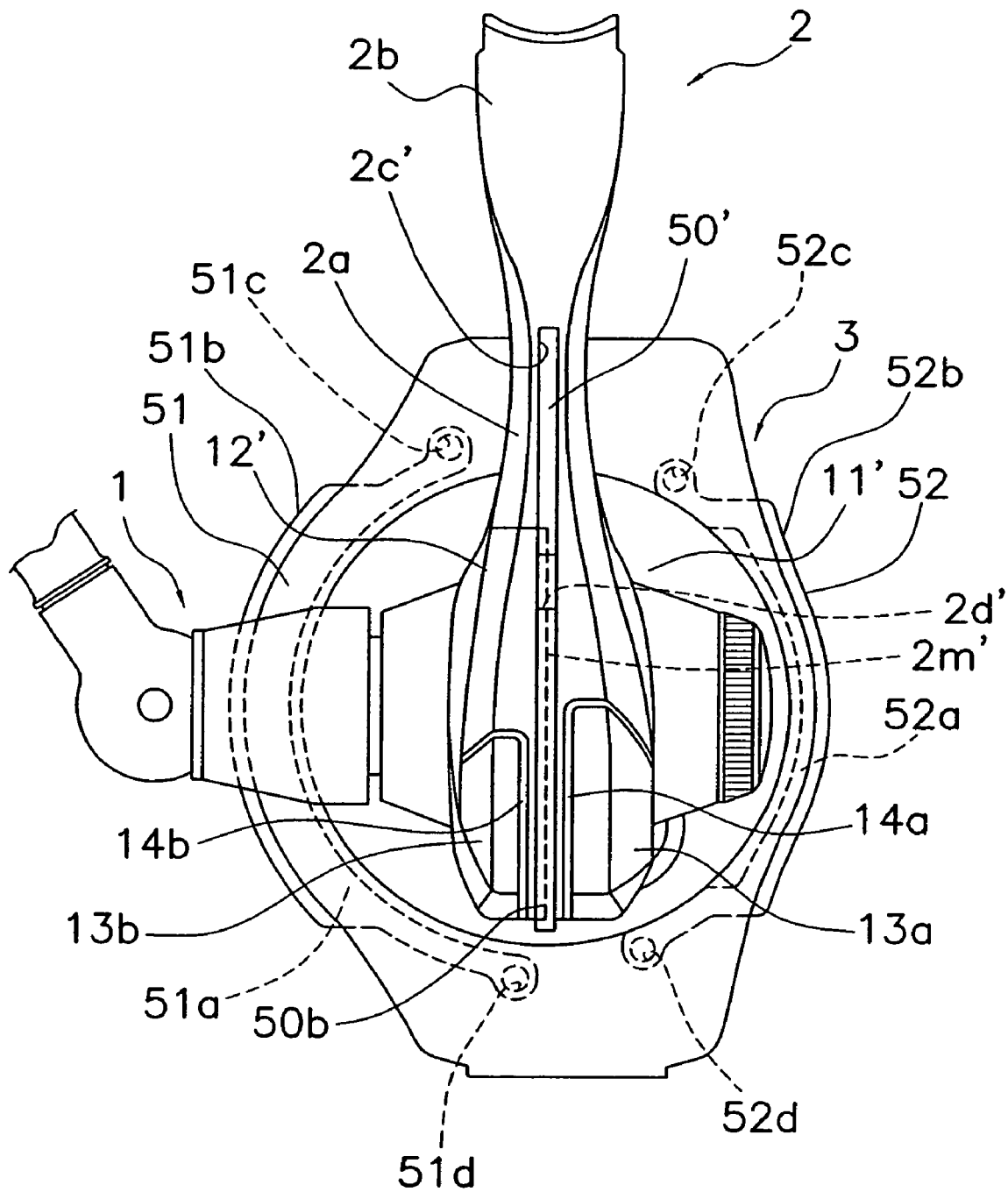
FIG. 22 is a rear view corresponding to FIG. 3 of the spinning reel in accordance with an alternate preferred embodiment (b) of the present invention.
Figure 23:
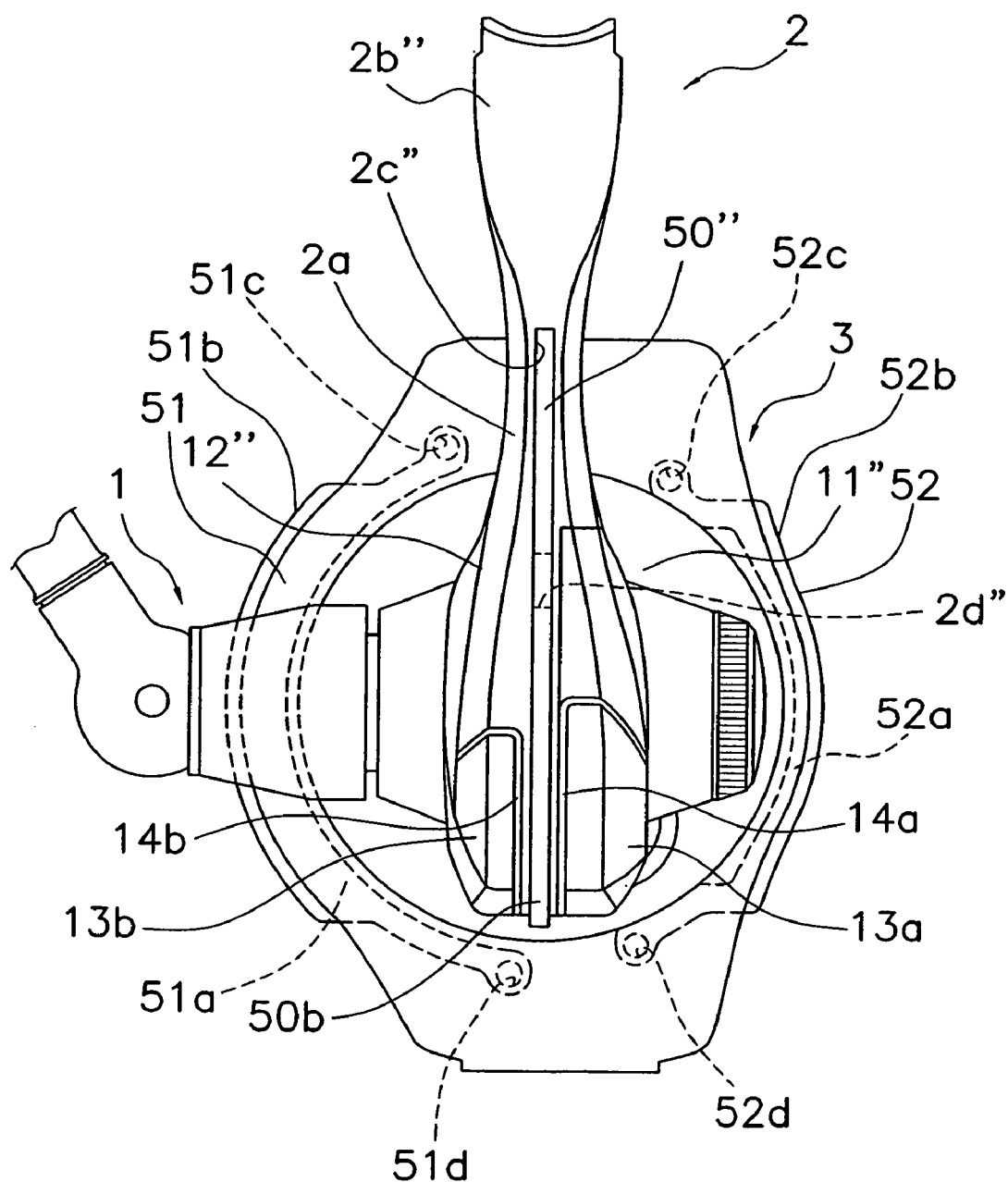
FIG. 23 is a rear view of the spinning reel in accordance with another preferred embodiment (b) of the present invention corresponding to FIG. 3.

(b) In the first embodiment, the first guard member 50 is embedded in the groove portion 2c of the body member 11, however, the first guard member 50 may be embedded in a groove portion formed in the lid member 12. Additionally, in FIG. 22, the first guard member 50' is embedded in a groove portion 2c' formed in a joint portion 2m' between the body member 11' and the lid member 12'. Furthermore, in FIG. 23, the lid portion 12" is formed integrally with the rod attachment portion 2b", and the guard member 50" is embedded in the lid member 12".

(c) In the first embodiment, the guard members 50-53 are made of a hard metal such as a stainless steel alloy. However, the guard members 50-53 are not limited to this kind of material. The guard members 50-53 may be made of a hard synthetic resin.

Figure 8:
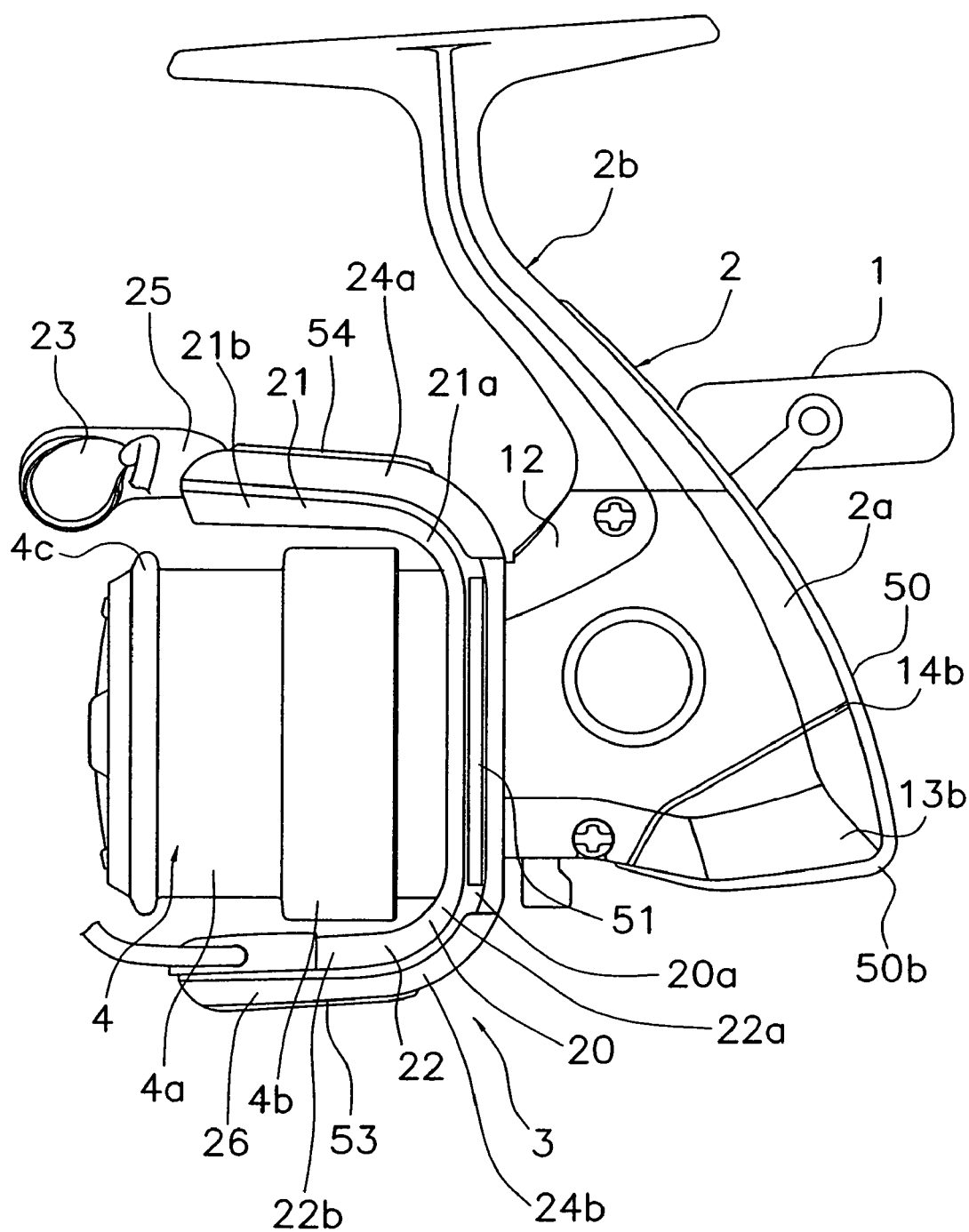
FIG. 8 is a side view corresponding to FIG. 1 of a spinning reel in accordance with an alternate embodiment (c) of the present invention.

(d) In the first embodiment, as shown in FIGS. 2 and 3, the guard members 50-53 are embedded in the reel unit 2 from the rod attachment leg 2b to the rear end portion 11a and the lower end portion 11b, on the opposite portions on the outer circumference of the cylindrical portion 30, and the outer portion of the second rotor arm 22. However, locations in which the guard members 50-53 are embedded are not limited to these locations. A guard member may be embedded in any location that can come into contact with the ground when the spinning reel is placed on the ground. For example, as shown in FIG. 8, a fourth guard member 54 is a plate member embedded in the outer peripheral portion of the first rotor arm 21.

Figure 9:
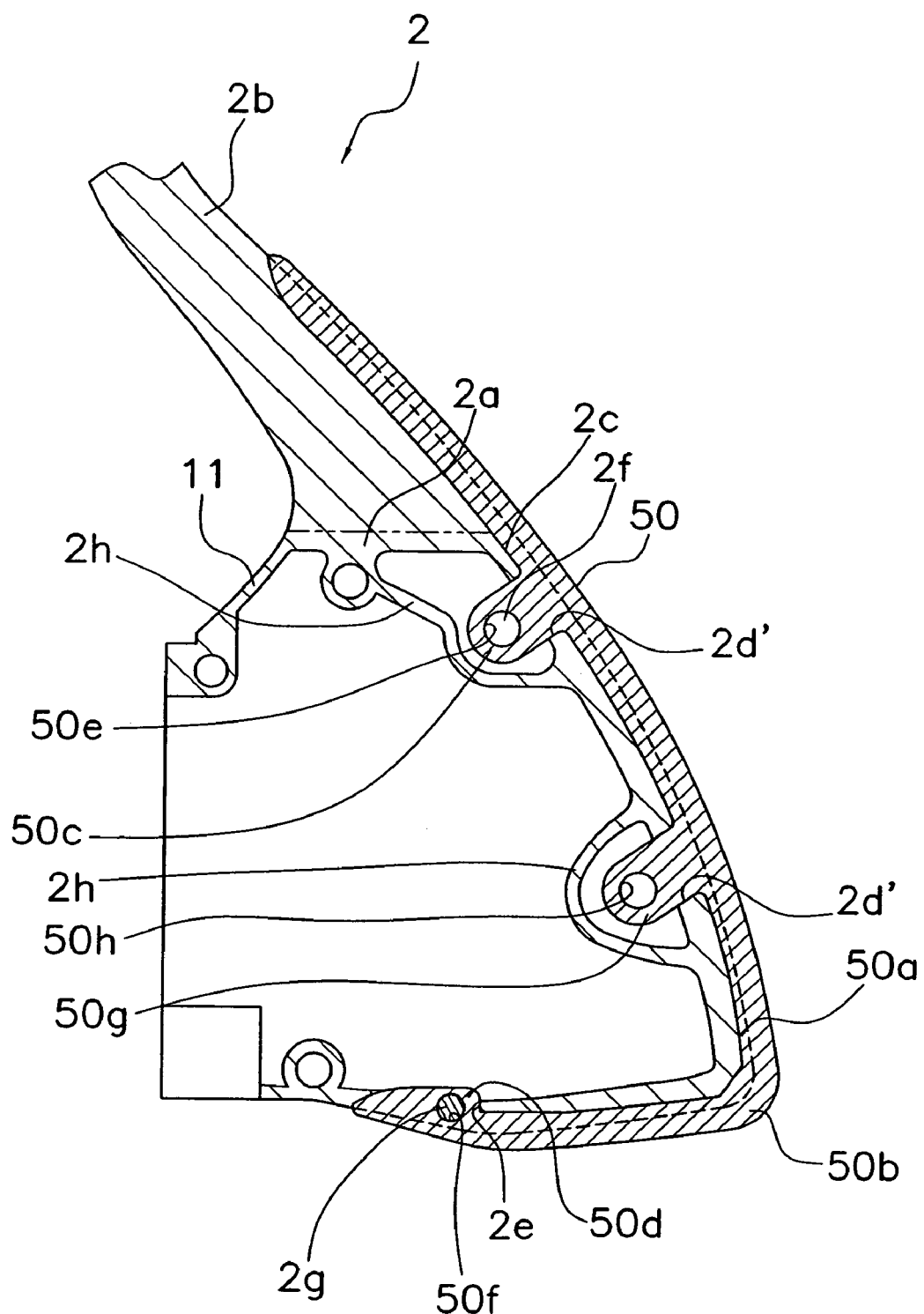
FIG. 9 is a cross-sectional view corresponding to FIG. 4 of a reel unit of a spinning reel in accordance with an alternate preferred embodiment (e) of the present invention.

(e) As shown in FIG. 4, in the first embodiment, the first guard member 50 is fastened to the body member 11 at one location by the attachment portion 50c that is formed at the rear portion of the guard member 50 and protruding toward the inner side. However, as shown in FIG. 9, the first guard member 50 may be fastened at two locations additionally by an attachment portion 50g with a through hole 50h located in the rear portion of the reel unit 2. The reel unit 2 has two through holes 2d' through which the attachment portion 50g extends inwardly.

Figure 10:
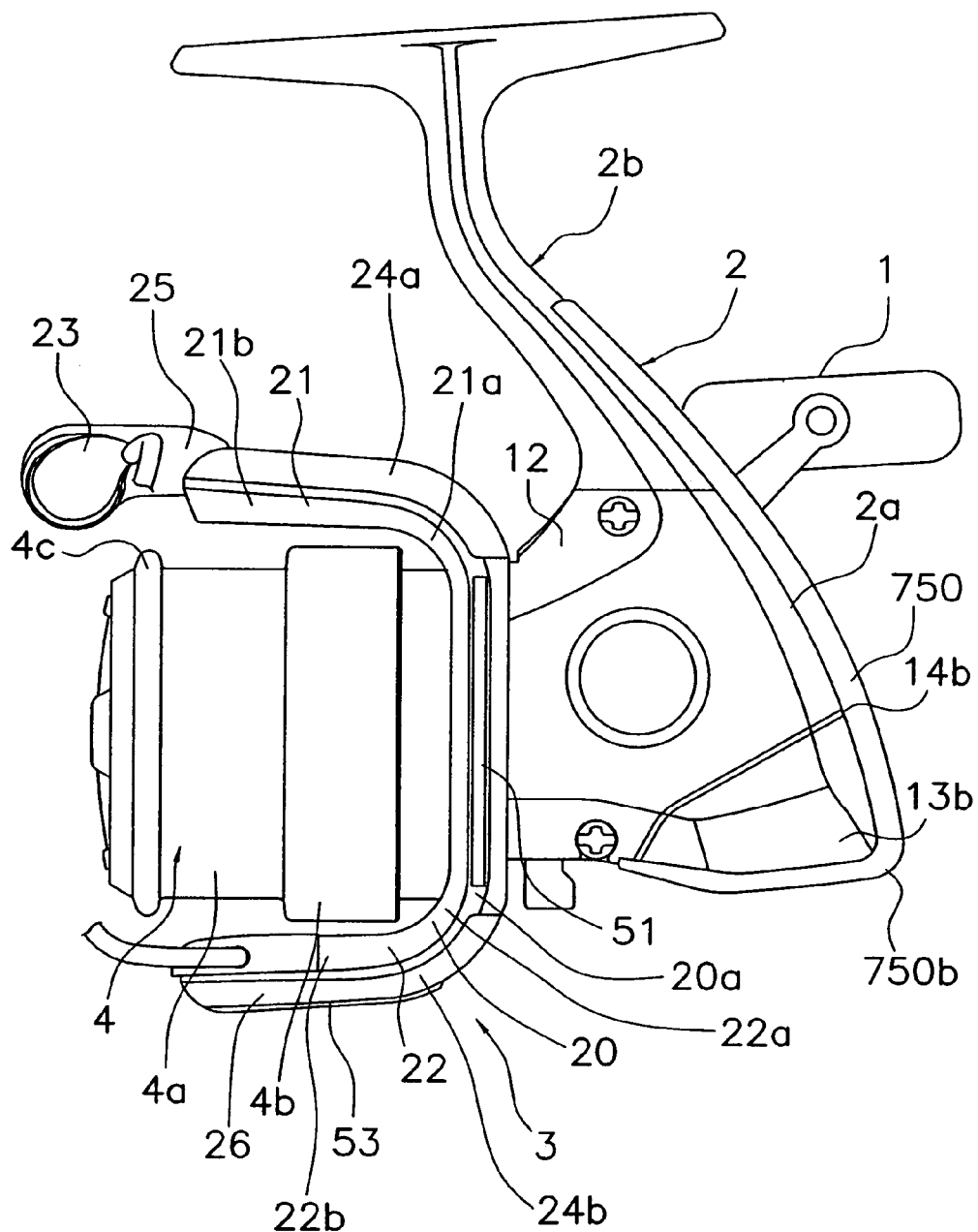
FIG. 10 is a side view corresponding to FIG. 1 of a spinning reel in accordance with an alternate preferred embodiment (f) of the present invention.
Figure 11:
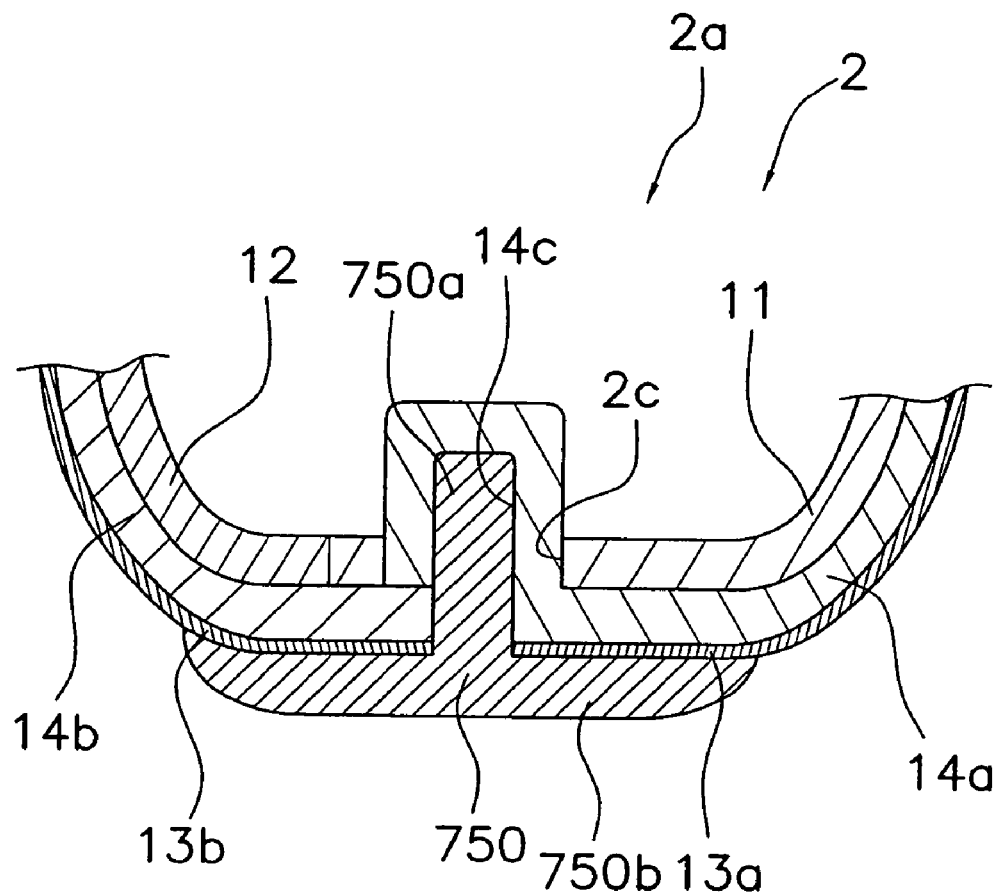
FIG. 11 is a cross-sectional view corresponding to FIG. 7 of a rear portion of a reel unit of a spinning reel in accordance with an alternate preferred embodiment (f) of the present invention.
Figure 12:
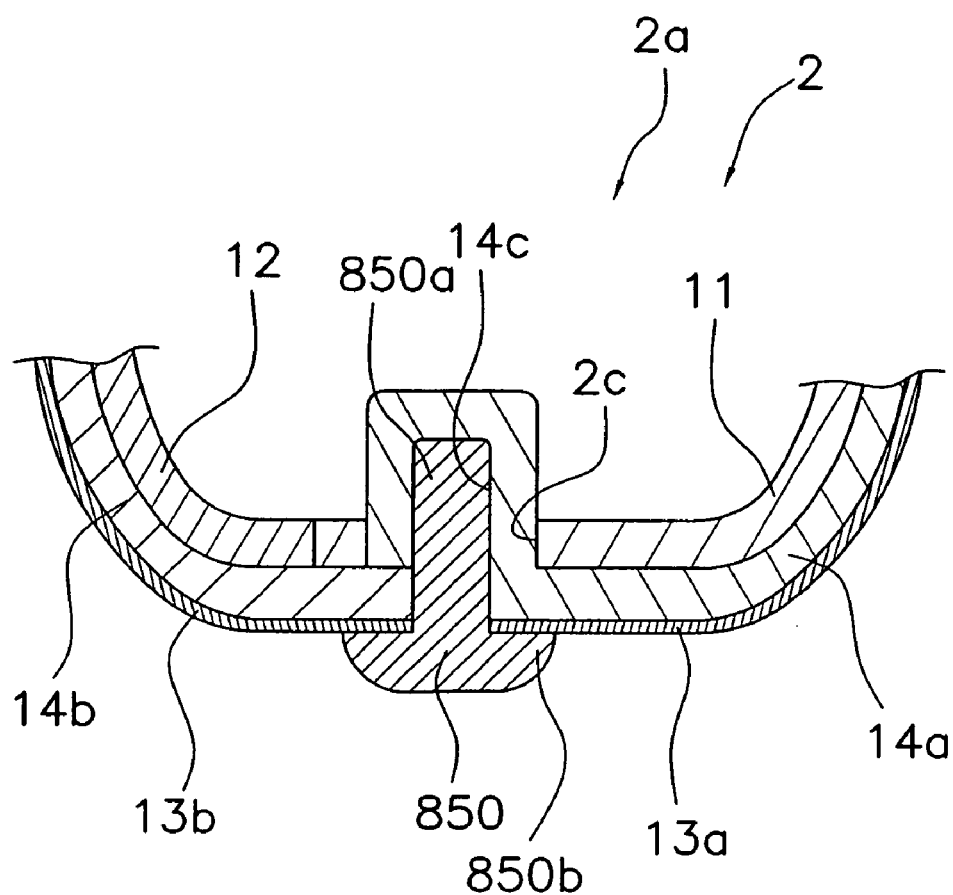
FIG. 12 is a cross-sectional view corresponding to FIG. 7 of a rear portion of a reel unit of a spinning reel in accordance with an alternate preferred embodiment (f) of the present invention.

(f) As shown in FIGS. 3, 4, and 6, in the first embodiment, the protruding portions 50b-53b protrude so that the end surfaces thereof extend in the form of a line-segment. However the present invention is not limited to this configuration. For example, as shown in FIGS. 10 and 11, a protruding portion 750b may be arranged along the outer contour of the rear end and the lower end portion of the reel body 2 so as to extend laterally in a direction transverse to the length of the guard member 750. More specifically the protruding portion 750b may extend from the end of the embedded portion 750a toward both sides of the embedded portion 750a along the contour of the rear end portion and the lower end portion of the reel body. The embedded portion 750a is a plate-shaped member to be embedded in the groove portion 2c. The embedded portion 750a and the protruding portion 750b are preferably integrally formed, preferably using a hard metal such as a stainless steel alloy or a synthetic resin to form a unitary member. The protruding portion 750b protrudes from the end of the embedded portion 750a toward both ends in a generally symmetrical shape so that the first guard member 750 has a generally T-shaped cross-sectional shape. In this case, since the protruding portion 750b covers a wide area of the contact surface of the reel unit 2 and the rod attachment portion 2b, it is possible to enhance the prevention of scratches on the reel unit 2. Furthermore, the protruding portion 750b is not limited to this shape. For example, as shown in FIG. 12, the protruding portion 850b can have a generally crescent-shaped cross-sectional shape. In other words, the length of the protruding portion 850b can be greater than, less than, or equal to the length of the embedded portion 850a.

Figure 13:
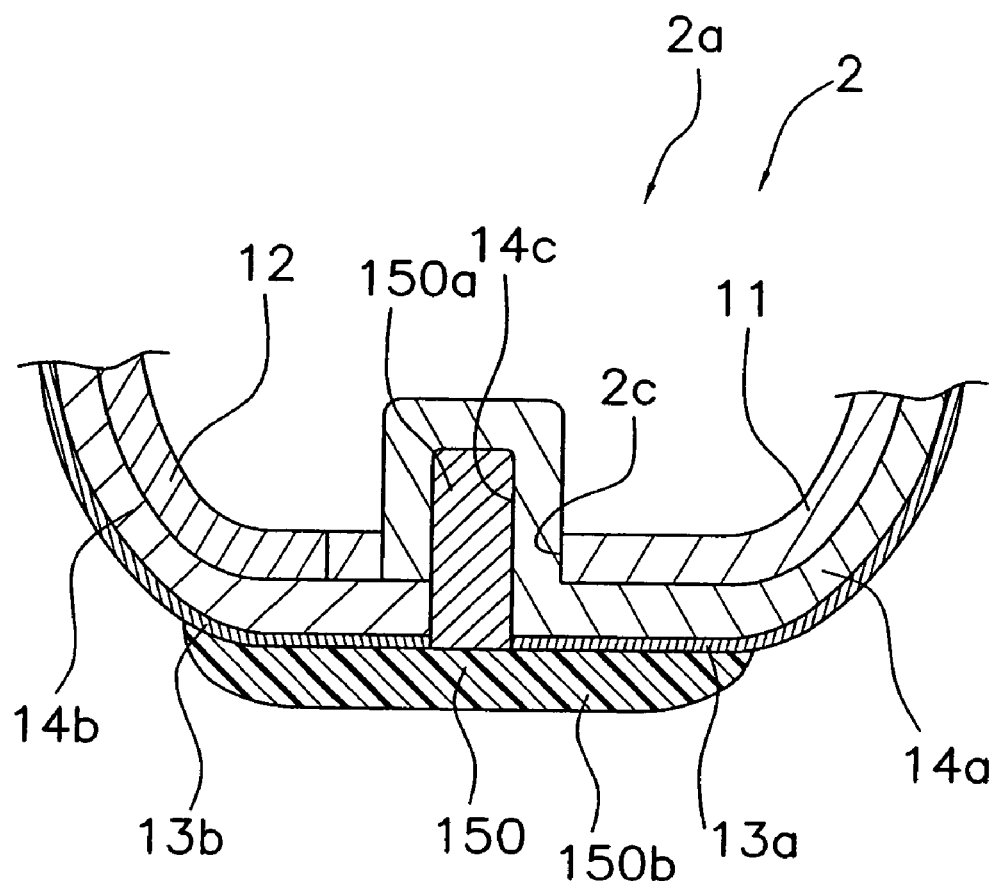
FIG. 13 is a cross-sectional view corresponding to FIG. 7 of a rear portion of a reel unit of a spinning reel in accordance with an alternate preferred embodiment (g) of the present invention.

(g) In the embodiment (f) mentioned above, the embedded portion 50a and the protruding portion 50b are integrally formed of a metal or a synthetic resin as unitary member. However, the present invention is not limited to this configuration. The embedded portion and the protruding portion may be separately formed of different materials. For example, as shown in FIG. 13, the embedded portion 150a can be made of a hard metal such as a stainless steel alloy, and the protruding portion 150b can be made of a synthetic resin. The protruding portion 50b made of a synthetic resin may be insert-molded into the embedded portion 50a made of a metal. In an alternate case, the protruding portion 150b may be bonded to the embedded portion 150a by insert-molding the protruding portion 150b in a diffusion layer, where a fine triazine thiol powder is diffused by an electrodeposition plating process on the surface of the embedded portion 150a made of a metal. In this case, the embedded portion 150a made of a hard metal can maintain its strength at a high level, while the protruding portion 150b made of a synthetic resin can be formed easily along the outer surface of the reel unit 2. In addition, although not illustrated, the embedded portion 150a can be made of a synthetic rein, and the protruding portion 150b can be made of a hard metal such as a stainless steel alloy.

Figure 14:
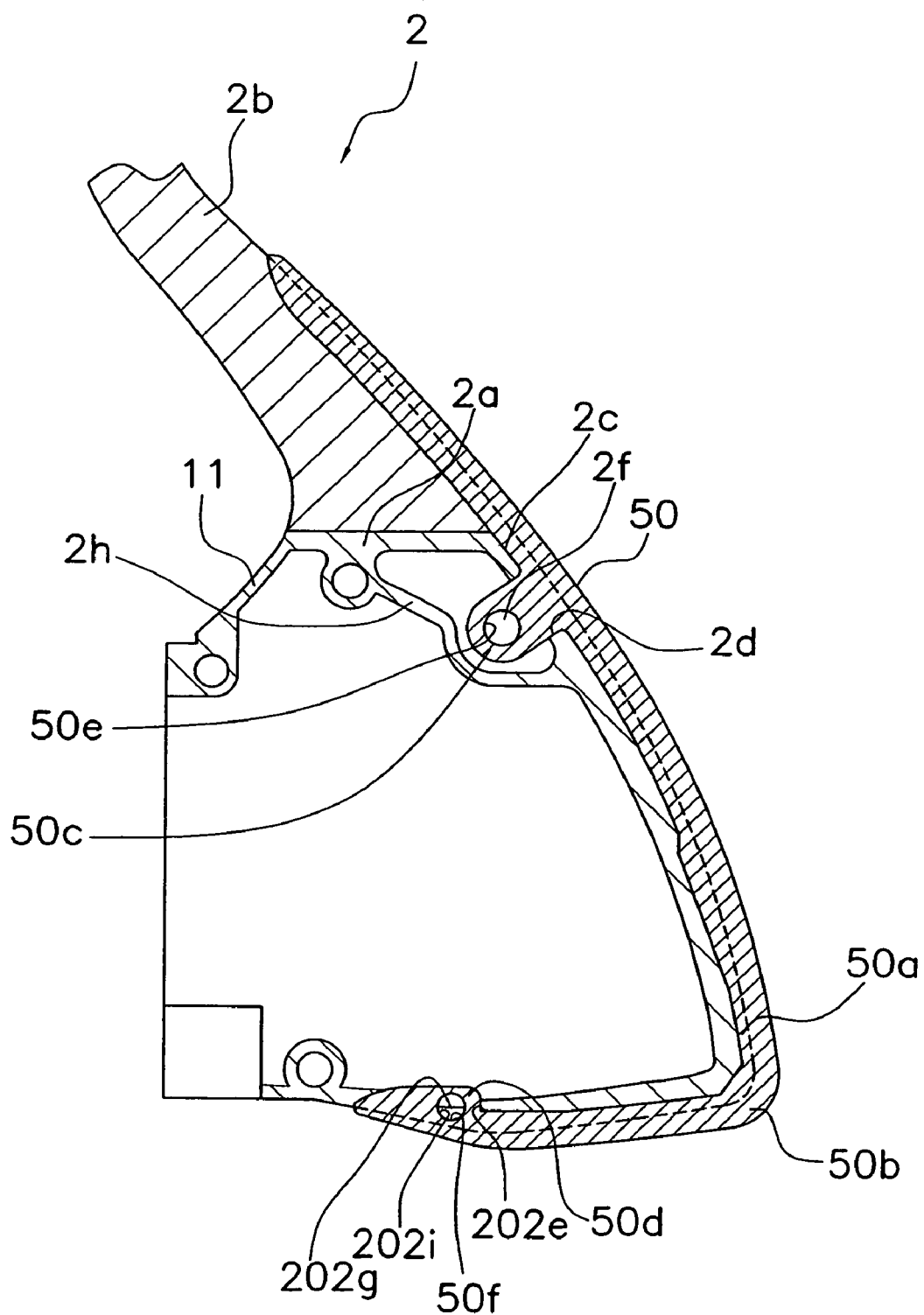
FIG. 14 is a cross-sectional side view corresponding to FIG. 4 of a reel unit of a spinning reel in accordance with an alternate preferred embodiment (h) of the present invention.
Figure 15:
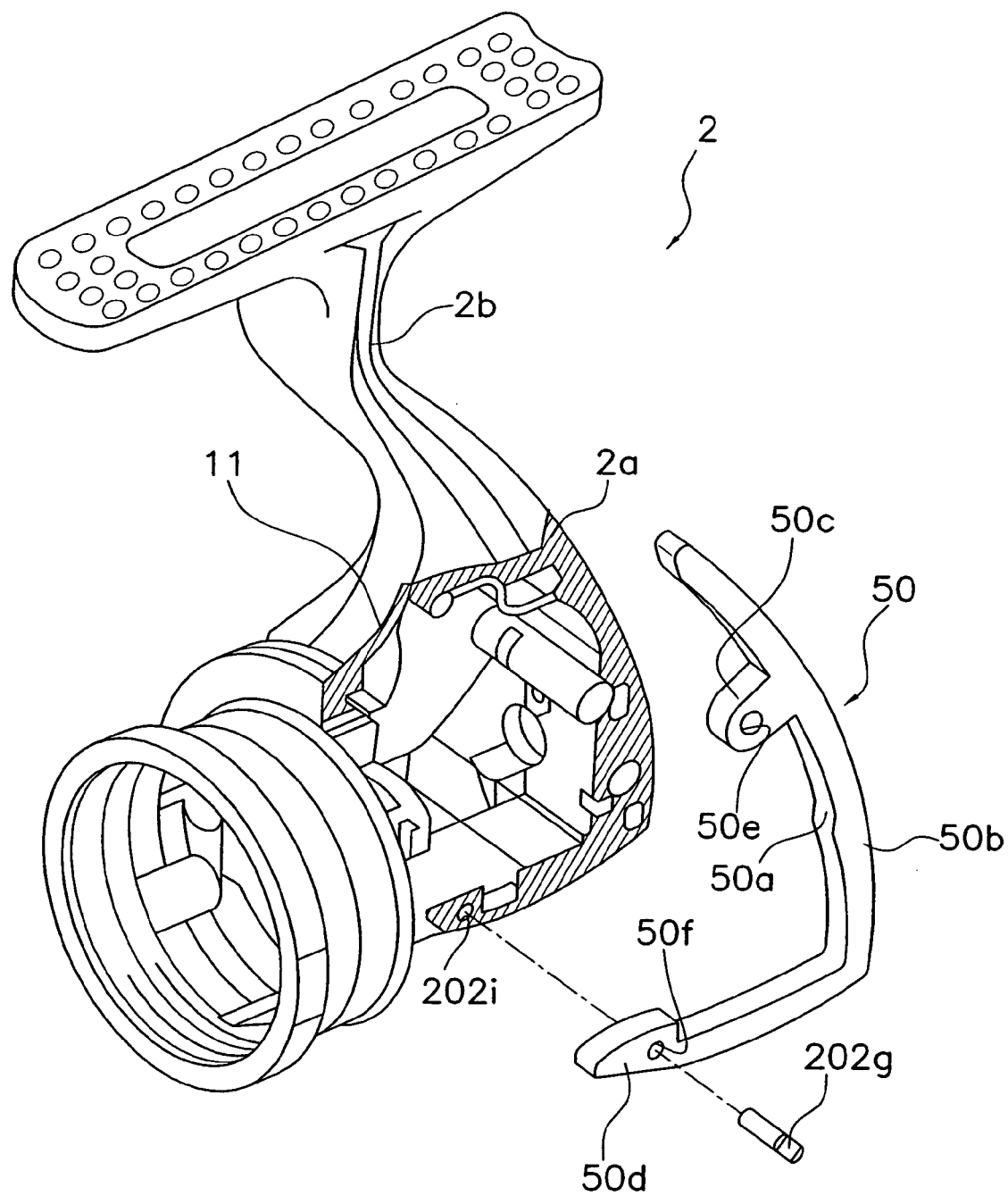
FIG. 15 is an exploded perspective view of a reel unit and a guard member of the spinning reel according to the embodiment (h)
Figure 16:
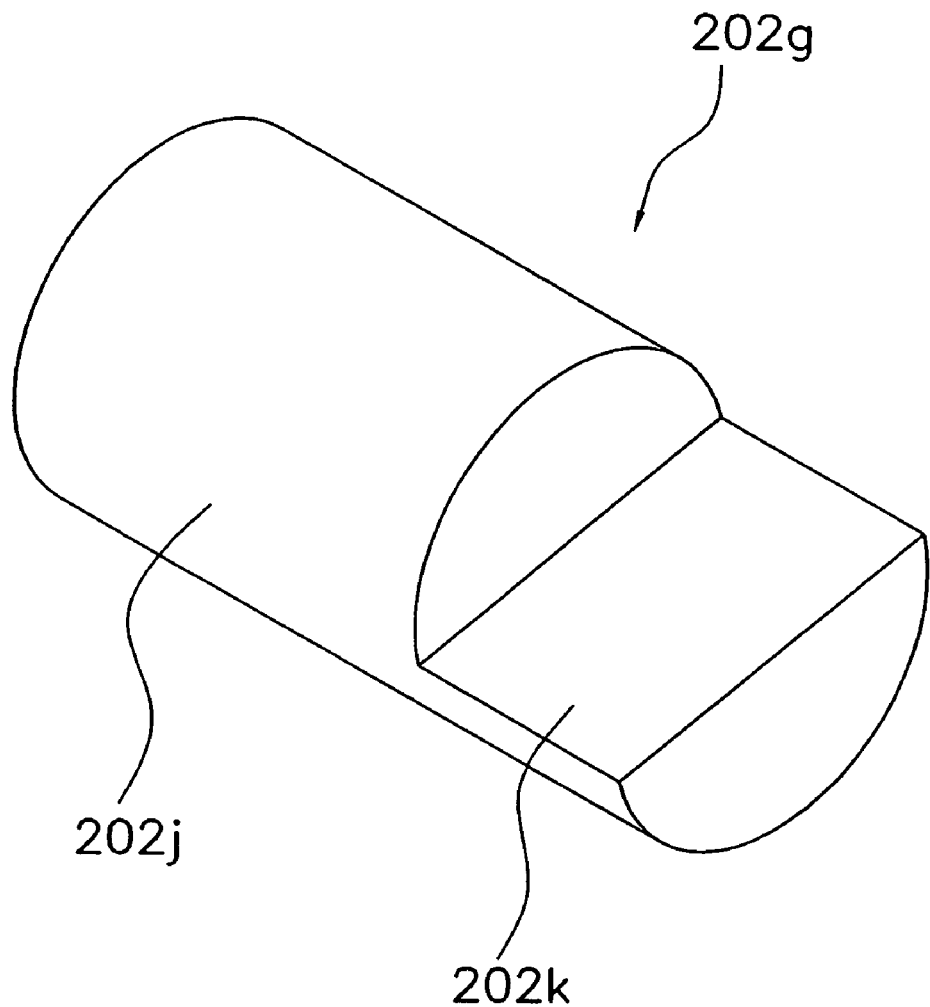
FIG. 16 is an enlarged perspective view of a positioning pin of the spinning reel of the embodiment (h)

(h) In the first embodiment, as shown in FIG. 4, the positioning pin 2g is formed on the body member 11 of the reel body 2a so as to protrude from the body member 11. However, a positioning pin 202g may be detachably mounted to the body member 11 as shown in FIGS. 14 and 15. In this case, for example, a recessed portion 202i is formed adjacent to the through hole 202e on the lower portion of the body member 11. The positioning pin 202g is mounted to the recessed portion 202i so that the tip of the positioning pin 202g protrudes from the recessed portion 202i. Thus, the first guard member 250 can be positioned by inserting the protruding portion of the positioning pin 202g into the through hole 50f formed in the positioning portion 50d of the first guard member 50. As shown enlarged in FIG. 16, the positioning pin 202g includes a columnar body portion 202j, a base end of which is mounted to the recessed portion 202i, and a knob portion 202k, which protrudes toward the tip end side in a generally semi-columnar shape. The knob portion 202k facilitates easy grasping by a thumb and a finger. The knob portion 202k is formed unitarily with the body portion 202j by removing a part of a columnar member. In this case, since the positioning pin 202g can be detached from the recessed portion 202i by picking up the knob portion 202k with a thumb and a finger, the positioning pin 202g can be easily attached and detached to the recessed portion 202i.

Figure 17:
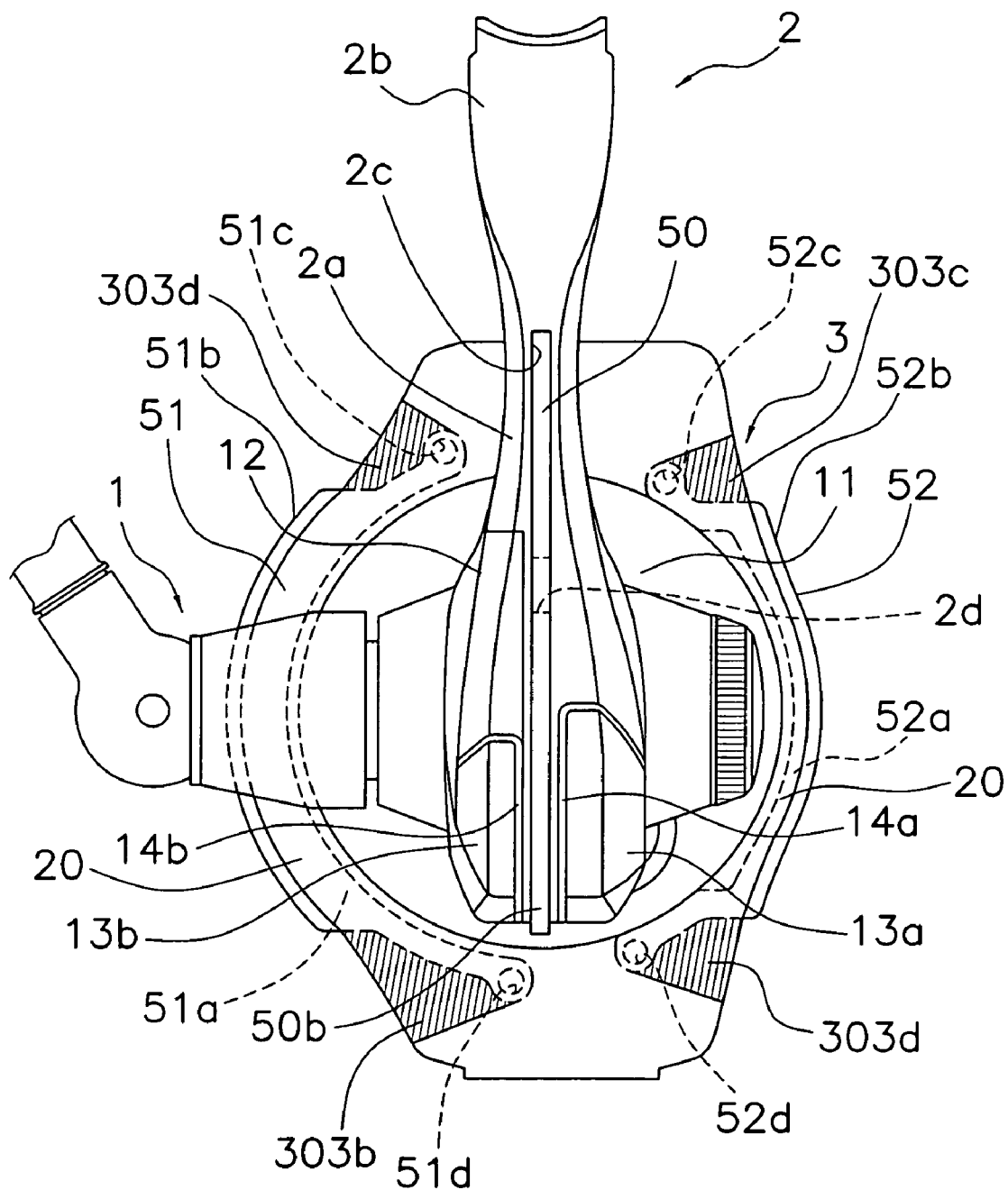
FIG. 17 is a rear view corresponding to FIG. 3 of a spinning reel in accordance with an alternate preferred embodiment (i) of the present invention.

(i) In the first embodiment, as shown in FIG. 3, the second and third guard members 51 and 52 are fastened to the cylindrical portion 20 by inserting screw members or pin members into the attachment portions 51c and 51d, 52c and 52d arranged at the both ends of the second and third guard members 51 and 52. However, as shown in FIG. 17, a pair of contact portions 303a and 303b, and a pair of contact portions 303c and 303d may be formed inside the cylindrical portion 20. In this configuration, when the second and third guard members 51 and 52 are inserted from the inside of the rotor 3 into the cylindrical portion 20, the pair of attachment portions 51c and 51d, and the pair of attachment portions 52c and 52d come in contact with the pair of contact portions 303a and 303b, and the pair of contact portions 303c and 303d, respectively. The contact portions 303a-303d can correctly position the second and third guard members 51 and 52. In this case, since the pair of the attachment portions 51c and 51d, and the pair of attachment portions 52c and 52d contact the pair of contact portions 303a and 303b, and the pair of contact portions 303c and 303d in order to position the second and third guard members 51 and 52, screw members or pin members can be easily inserted into the pair of the attachment portions 51c and 51d and the pair of attachment portions 52c and 52d to fasten the second and third guard members 51 and 52 to the rotor 3. Furthermore, when the second and third guard members 51 and 52 are mounted, the screw members or the pin members are hidden and are not exposed. Thus, it is possible to improve the appearance of the design.

(j) In the first embodiment, as shown in FIG. 3, the second and third guard members 51 and 52 are mounted in order to prevent a part of the rotor 3 surface that would normally contact the ground from being scratched. However, the shapes (length in the width direction, or thickness) or the mass of the second and third guard members 51 and 52 may be further adjusted in order to maintain the rotational balance of the rotor 3.

Figure 18:
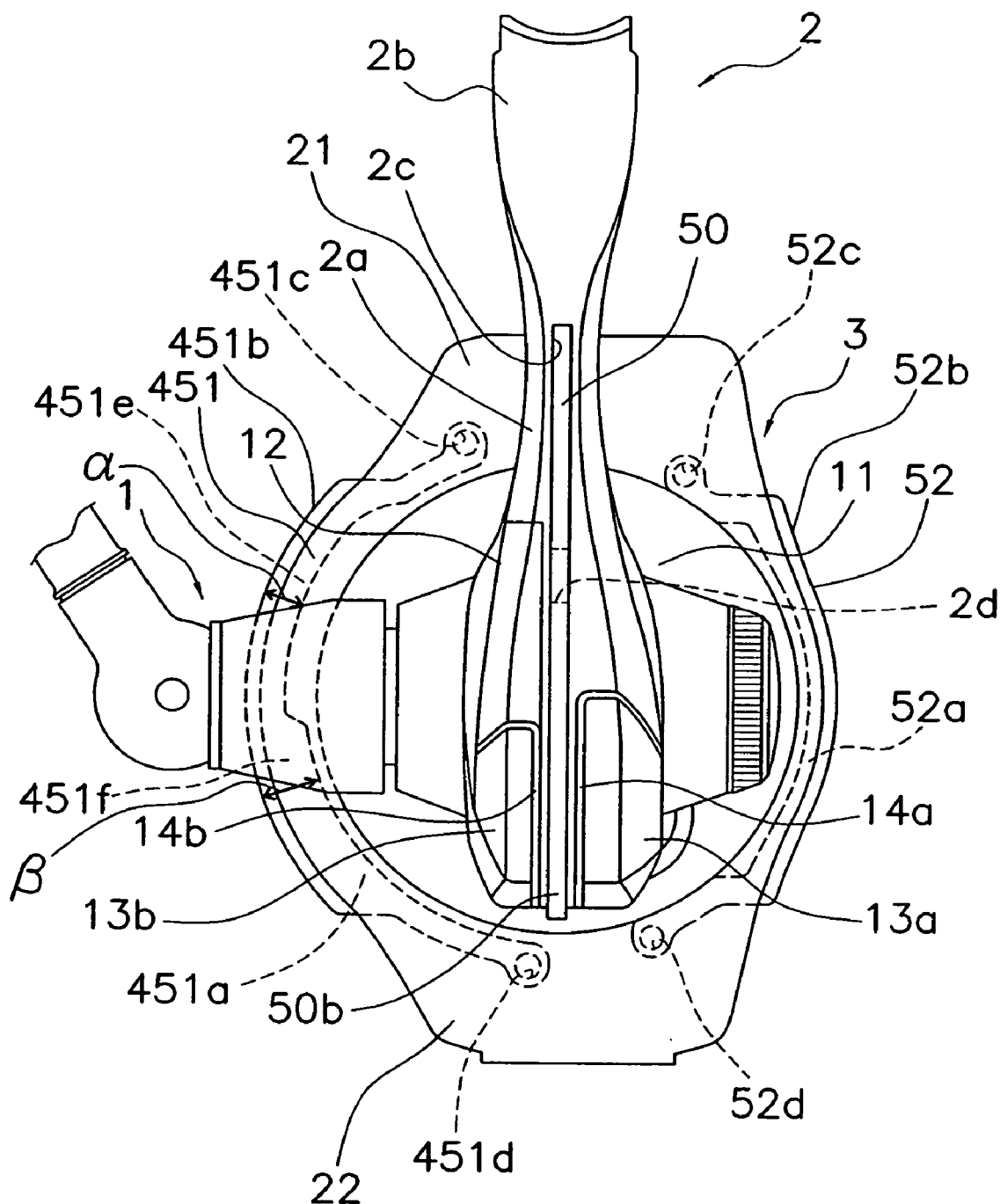
FIG. 18 is a rear view corresponding to FIG. 3 of a spinning reel in accordance with an alternate preferred embodiment (j) of the present invention.
Figure 19:
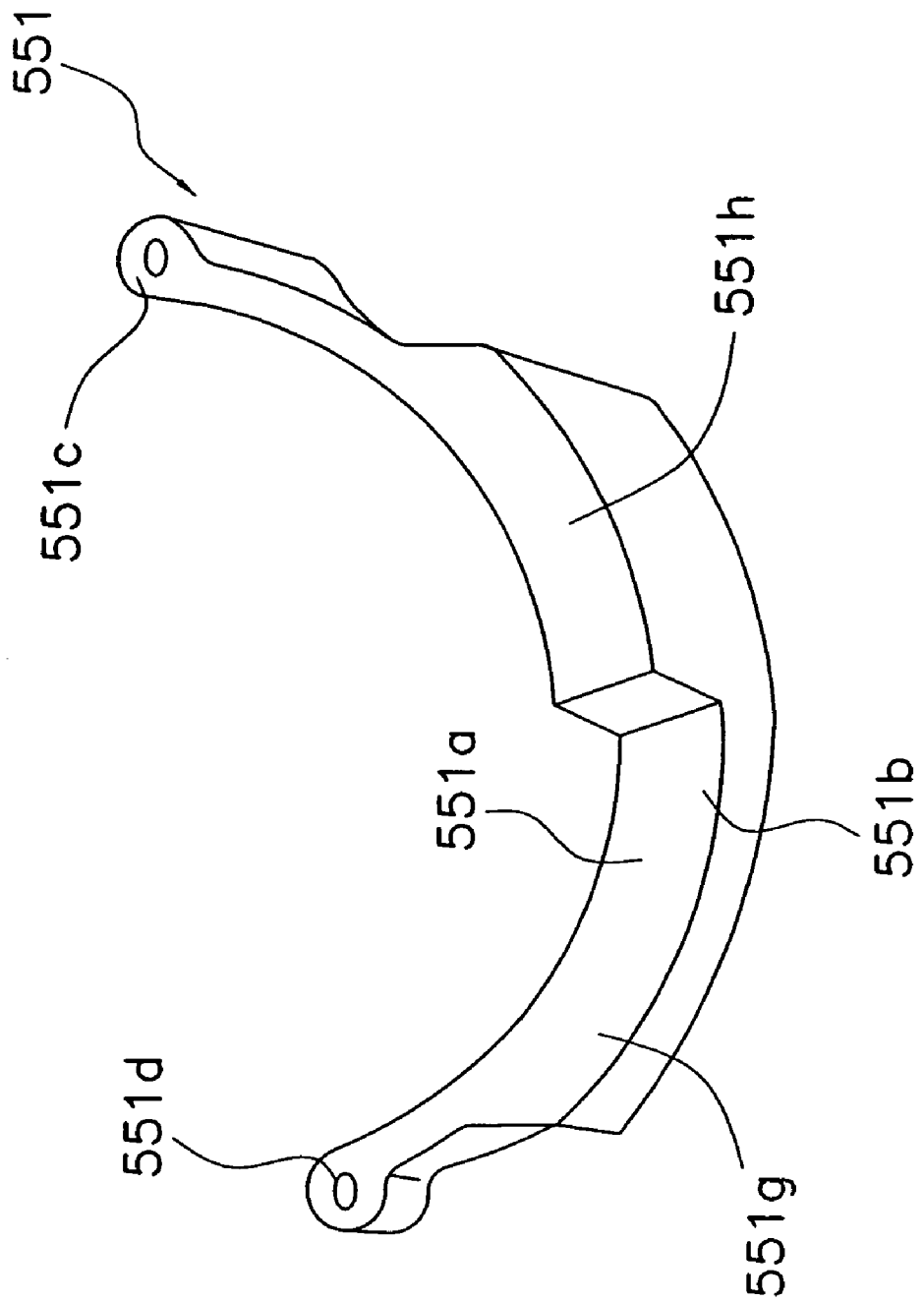
FIG. 19 is a perspective view of a guard member of a spinning reel in accordance with another embodiment (j) of the present invention.

Further, at least one of the second and third guard members 51 and 52 can be designed to have a shape or mass that differs between the first rotor arm 21 side and the second rotor arm 22 side in order to maintain the rotational balance of the rotor 3. For example, the second guard member 51 can have a width that differs between the first rotor arm 21 side and the second rotor arm 22 side. Specifically, as shown in FIG. 18, the second guard member 451 includes a narrower portion 451e formed at the first rotor arm 21 side to have a narrower width. The second guard member 451 of FIG. 18 also has a wider portion 451f formed at the second rotor arm 22 side to have a wider width $\beta$ than the width $\alpha$ of the narrower portion 51e. The widths in this case are lengths transverse to the axial direction of the rotor 3. In another case, as shown in FIG. 19, the second guard member 551 includes a thinner portion 551g formed at the first rotor arm 21 side, and a thicker portion 551h formed at the second rotor arm 22 side to be thicker than the thinner portion 551g. In this case, since the narrower portion 451e or the thinner portion 551g is formed at the first rotor arm 21 side of the second guard member 451 or 551, the mass at the first rotor arm 21 side is smaller than that of the second rotor arm 22 side of the second guard member 51. On the other hand, since the first rotor arm 21 includes a mechanism such as the bail arm 23 inside, the mass of the first rotor arm 21 side of the rotor 3 is greater than that of the second rotor arm 22 side of the second rotor 3. Accordingly, forming the narrower portion 451e or the thinner portion 551g at the first rotor arm 21 side of the second guard member 51 can balance mass of the rotor 3 and the guard member 451 or 551 as a whole between the first rotor arm 21 side and the second rotor arm 22 side. Therefore, it is possible to maintain rotational balance of the rotor 3.

Figure 20:
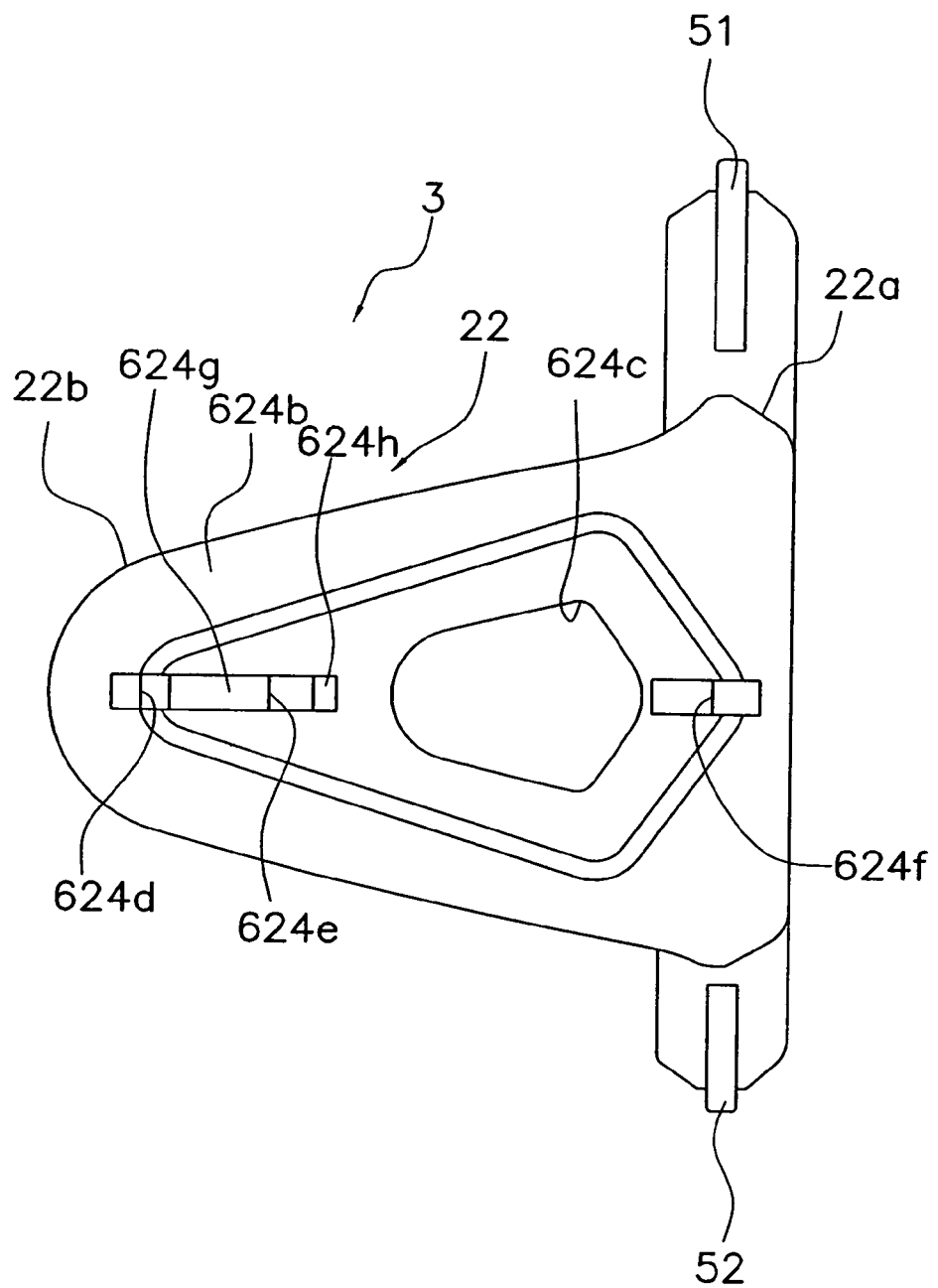
FIG. 20 is a plan view corresponding to FIG. 5 of a rotor arm of a spinning reel in accordance with an alternate preferred embodiment (k) of the present invention.
Figure 21:
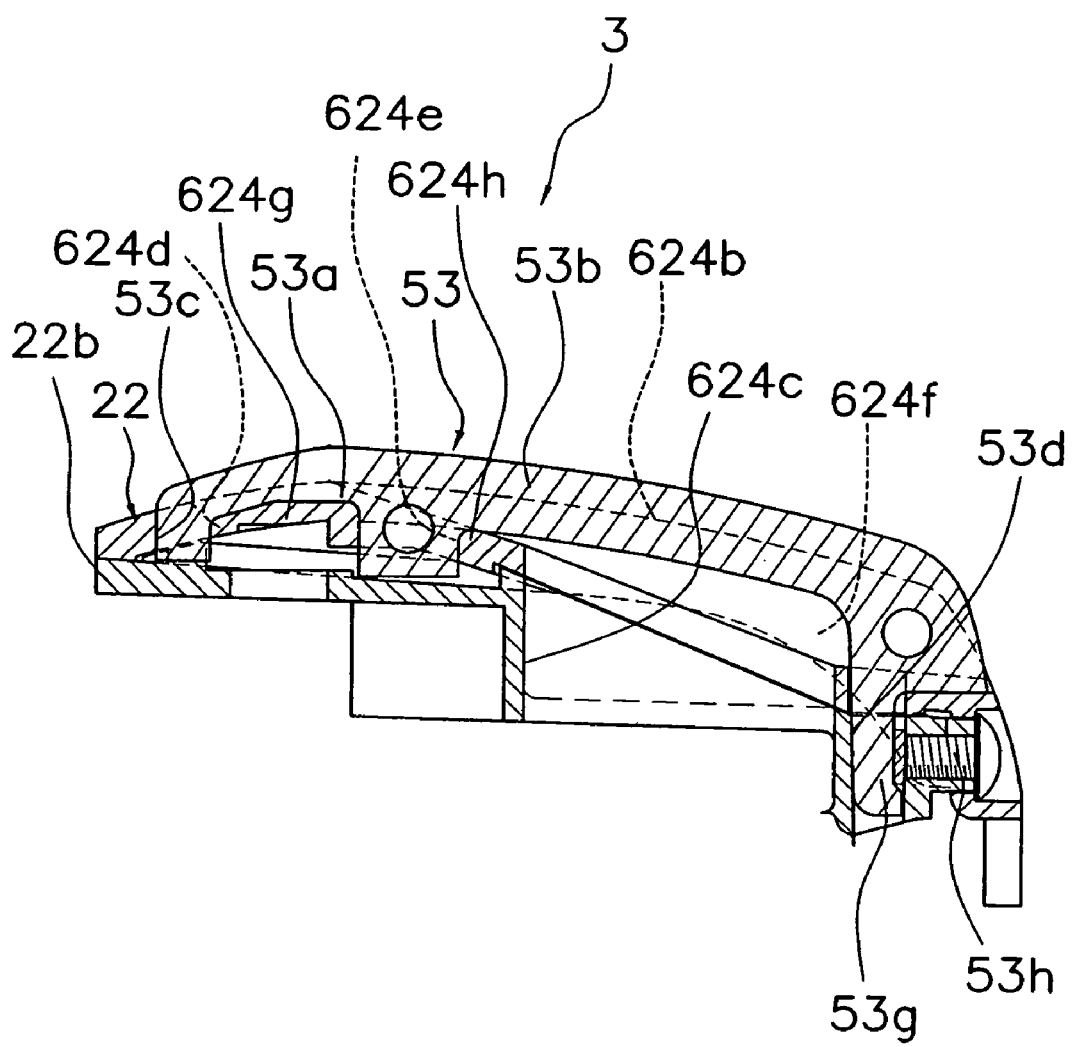
FIG. 21 is a cross-sectional view corresponding to FIG. 6 of the rotor arm of the embodiment (k)

(k) In the first embodiment, as shown in FIG. 6, the fourth guard member 53 is mounted from the front end to the rear end of the hole portion 24c of the second cover portion 24b to attach the front end portion and the rear end portion of the fourth guard member 53 to the hole portion 24c. On the other hand, as shown in FIGS. 20 and 21, the second cover portion 624b includes through holes 624d and 624e, into which the embedded portion 53a is inserted, a through hole 624f, and a contact portion 624g. The through holes 624d and 624e are formed at locations opposed to the first groove portion 22c. The through hole 624f, into which the embedded portion 53a is inserted, is formed at a location opposed to the second groove portion 22d. The contact portion 624g, with which the embedded portion 53a contacts, is formed between the through holes 624d and 624e. In this case, when the fourth guard member 53 is mounted, the backside surface of the embedded portion 53a is in contact with the contact portion 624g of the second cover portion 624b, and the fourth guard member 53 can press the second cover portion 624b. Thus, the end part portion of the second cover portion 624b can be aligned. In addition, since a contact portion 24h, with which the embedded portion 53a is in contact, is further formed at the rear side of the through hole 624e, the end part of the second cover portion 624b can be stably supported to the second rotor arm 22 when the second cover portion 624b is fastened with a screw member.

(l) In the first embodiment, as shown in FIGS. 3, 4, and 6, the embedded portions 50a-53a are embedded in the reel unit 2 from the rod attachment leg 2b of to the rear end portion and the lower end portion of the reel unit 2, to the rotor 3 on the opposite sides of the outer peripheral portion of the cylindrical portion 30, and the outer peripheral portion of the second rotor arm 22, such that the guard members 50-53 can contact the ground when the spinning reel is placed thereon. However, the present invention is not limited to these arrangements. For example, the embedded portion 50a may be embedded in a location away from the rear end portion and the lower end portion of the reel unit 2. In this configuration, the protruding portion 50b is designed to be thick enough to be in contact with the ground. Thus, the surface of the reel unit 2 does not come in direct contact with the ground.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-296346 and 2003-411638. The entire disclosures of Japanese Patent Application Nos. 2003-296346 and 2003-411638 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning reel comprising:
a reel unit being adapted to be mounted on a fishing rod;
a handle being rotatably attached to said reel unit;
a spool being movably mounted to said reel unit to move back and forth relative to said reel unit, said spool having an outer peripheral portion on which fishing line is adapted to be wound and unwound;
a rotor being rotatably mounted to said reel unit, said rotor being adapted to wind said fishing line onto said spool in response to rotation of said handle;
a plate-shaped guard member having an embedded portion and a protruding portion, said plate-shaped guard member being attached to at least one of said reel unit and said rotor such that said protruding portion protrudes from an outer surface of said at least one of said reel unit and said rotor, said embedded portion being embedded in at least one of said reel unit and said rotor more than said protruding portion protrudes from said outer surface and being embedded more than a lateral width of said plate-shaped guard member, said plate-shaped guard member being configured and arranged such that said protruding portion contacts a flat ground surface when the spinning reel is placed thereon and the entire spinning reel is over said flat ground surface.

2. The spinning reel according to claim 1, wherein
said reel unit includes a reel body and a rod attachment leg extending diagonally from said reel body so as to be integral with said reel body, said rod attachment leg is configured to be coupled to a fishing rod, and
said guard member is attached to an outer surface of at least one of a rear end portion of said reel body, a lower end portion of said reel body, and a rear end portion of said rod attachment leg.

3. The spinning reel according to claim 1, wherein
said reel unit includes a body member, and a lid member fastened to said body member with a screw, a groove portion being formed in at least one of said body member and said lid member, and
said guard member is inserted in said groove portion.

4. The spinning reel according to claim 1, wherein
said reel unit includes a body member, and a lid member fastened to said body member with a screw, a groove portion being formed in a joint portion between said body member and said lid member, and
said guard member is inserted in said groove portion formed in said joint portion between said body member and said lid member.

5. The spinning reel according to claim 1, wherein
said rotor further includes a cylindrical portion, rotor arms, and a bail arm, said cylindrical portion being rotatably mounted to said reel unit, said rotor arms being arranged on said cylindrical portion opposite each other and connectedly formed on a rear side outer peripheral surface of said cylindrical portion, said bail arm being pivotably mounted to fore-ends of said rotor arms to guide said fishing line to said spool, and
said guard member is attached to at least one of an outer peripheral portion of said cylindrical portion, an outer peripheral portion of said rotor arm, and an outer peripheral portion of said bail arm.

6. The spinning reel according to claim 5, wherein
at least one of said rotor arms being provided with a hole portion that penetrates from an inner periphery to an outer peripheral portion of said rotor arm, and first and second groove portions being respectively formed on front and rear sides of said hole portion, and
said guard member is inserted in said first and second groove portions to connect said front side to said rear side of said hole portion.

7. The spinning reel according to claim 1, wherein
said guard member is fastened to said rotor with a screw.

8. The spinning reel according to claim 1, wherein
said guard member is made of a material harder than a material from which said rotor is made.

9. The spinning reel according to claim 8, wherein
said guard member is a metal member.

10. The spinning reel according to claim 8, wherein
said guard member is a synthetic resin member.

11. The spinning reel according to claim 1, wherein
a part of said guard member extends linearly to define a flat surface.

12. The spinning reel according to claim 1, wherein
said width direction surface portion extends along a contour of the outer surface of said at least one of said reel unit and said rotor in a direction transverse to a longitudinal length of said guard member.

13. The spinning reel according to claim 12, wherein
said width direction surface portion extends on both sides of said plate surface portion along a contour of the outer surface of said one of said reel unit and said rotor.

14. The spinning reel according to claim 1, wherein
said guard member is formed of at least two different materials.

15. The spinning reel according to claim 14, wherein
said guard member is made of a synthetic resin and a metal.

16. The spinning reel according to claim 15, wherein
a part of said guard member made of a synthetic resin is bonded to a surface of a part of said guard member which is made of a metal.

17. The spinning reel according to claim 1, wherein
said guard member is attached to said at least one of said reel unit and said rotor such that said width direction surface portion contacts a ground when said spinning reel is placed on the ground.

18. The spinning reel according to claim 1, wherein
said guard member has a narrower portion and a wider portion, said wider portion having a width that is wider than a width of said narrower portion.

19. The spinning reel according to claim 1, wherein
said guard member has a thicker portion and a thinner portion, said thicker portion having a thickness that is greater than a thickness of said thinner portion.

* * * * *